(12) United States Patent
Kourogi et al.

(10) Patent No.: US 10,288,431 B2
(45) Date of Patent: May 14, 2019

(54) DEVICE FOR ESTIMATING MOVING OBJECT TRAVEL DIRECTION AND METHOD FOR ESTIMATING TRAVEL DIRECTION

(71) Applicant: National Institute of Advanced Industrial Science and Technology, Tokyo (JP)

(72) Inventors: Masakatsu Kourogi, Ibaraki (JP); Takeshi Kurata, Ibaraki (JP); Tomoya Ishikawa, Ibaraki (JP); Takashi Okuma, Ibaraki (JP)

(73) Assignee: NATIONAL INSTITUTE OF ADVANCE INDUSTRIAL, Tokyo (JP)

( * ) Notice: Subject to any disclaimer, the term of this patent is extended or adjusted under 35 U.S.C. 154(b) by 763 days.

(21) Appl. No.: 14/411,794

(22) PCT Filed: Jul. 12, 2013

(86) PCT No.: PCT/JP2013/069152
§ 371 (c)(1),
(2) Date: Apr. 7, 2015

(87) PCT Pub. No.: WO2014/010727
PCT Pub. Date: Jan. 16, 2014

(65) Prior Publication Data
US 2015/0211863 A1 Jul. 30, 2015

(30) Foreign Application Priority Data
Jul. 13, 2012 (JP) ................................ 2012-157760

(51) Int. Cl.
*G01C 21/10* (2006.01)
*G01P 13/02* (2006.01)
(Continued)

(52) U.S. Cl.
CPC ............. *G01C 21/10* (2013.01); *G01C 21/16* (2013.01); *G01C 22/006* (2013.01); *G01P 3/00* (2013.01); *G01P 13/02* (2013.01); *G01P 15/00* (2013.01)

(58) Field of Classification Search
CPC . G01P 13/02; G01P 15/00; G01P 3/00; G01C 21/16; G01C 21/10; G01C 22/006
See application file for complete search history.

(56) References Cited

U.S. PATENT DOCUMENTS

2017/0023604 A1* 1/2017 Kourogi ................. G01C 21/16

FOREIGN PATENT DOCUMENTS

| JP | 2005-114537 | 4/2005 |
|----|-------------|--------|
| JP | 2009-156660 | 7/2009 |

(Continued)

OTHER PUBLICATIONS

Kourogi et al., "Indoor/Outdoor positioning of handheld devices based on pedestrian dead reckoning", IEICE Technical Report MVE2010-96, pp. 171-176 (2011) (with partial translation).
(Continued)

*Primary Examiner* — Mischita L Henson
(74) *Attorney, Agent, or Firm* — Renner, Otto, Boissell & Sklar, LLP

(57) ABSTRACT

The present invention provides a device and method for estimating a travel direction of a moving body, the device and method allowing highly accurate estimation of the travel direction even in the case where the positional relationship between the moving body and the self-contained sensing device or the posture is changed freely.
The travel direction estimating device includes (i) a gravitational direction vector estimating section 2407 for estimating a gravitational direction vector on the basis of
(Continued)

respective outputs of an acceleration sensor and an angular velocity sensor, (ii) a tentative travel direction vector generating section 2413 as a candidate of travel direction vector, (iii) a walk frequency estimating section 2424 for estimating a walk frequency from component data resulting from projecting acceleration component data for the gravitational direction vector, and (iv) a travel direction vector determining section 2425 for determining an objective function and a phase difference on the basis of a frequency component of a component Af resulting from projecting the acceleration component data for a travel direction vector, a frequency component of a component An resulting from projecting the acceleration component data for a side-to-side direction vector, a frequency component of a component Ws resulting from projecting angular velocity component data for the travel direction vector, a frequency component of a component Wn resulting from projecting the angular velocity component data for the side-to-side direction vector, a walk frequency, and the phase of the walk frequency, selecting as travel direction vectors, tentative travel direction vectors with which the phase difference is within a predetermined range and each of which maximizes the value of the objective function, and determining the side of the travel direction.

14 Claims, 10 Drawing Sheets

(51) Int. Cl.
    *G01C 21/16*    (2006.01)
    *G01C 22/00*    (2006.01)
    *G01P 3/00*     (2006.01)
    *G01P 15/00*    (2006.01)

(56) References Cited

FOREIGN PATENT DOCUMENTS

| | | |
|---|---|---|
| JP | 2011-237452 | 11/2011 |
| JP | 2011-245285 | 12/2011 |
| JP | 2012-021870 A | 2/2012 |
| JP | 2012-132851 | 7/2012 |
| JP | 2012-145457 | 8/2012 |

OTHER PUBLICATIONS

Kourogi et al., "Indoor positioning system using a self-contained sensor module for pedestrian navigation and its evaluation", Symposium on Mobile Interactions 2008, proceedings, pp. 151-156 (2008) (with partial translation).

International Preliminary Report on Patentability for corresponding International Application No. PCT/JP2013/069152 dated Jan. 13, 2015.

International Search Report for corresponding International Application No. PCT/JP2013/069152 dated Oct. 15, 2013.

\* cited by examiner

DEVICE FOR ESTIMATING MOVING OBJECT TRAVEL DIRECTION AND METHOD FOR ESTIMATING TRAVEL DIRECTION

TECHNICAL FIELD

The present invention relates to a technique of estimating a travel direction of a moving body.

BACKGROUND ART

There has been a practice of estimating a move direction of a moving body on the world coordinate system on the basis of measurement data generated by a self-contained sensing device (for example, an acceleration sensor, a magnetic sensor, a gyroscope, or an atmospheric pressure sensor) built in a terminal held by the moving body (for example, a walker) (Non Patent Literature 1).

Estimating a move direction of a moving body on the world coordinate system requires estimating the following three vectors simultaneously on a sensor coordinate system of the self-contained sensing device: (1) a gravitational direction vector, (2) a horizontal reference direction vector (for example, the direction of true north), and (3) a travel direction vector.

Estimating (tracking) the above vectors (1) to (3) allows estimation of the angle formed by the travel direction with respect to the horizontal reference direction, thereby allowing estimation of the azimuth of a move of the walker.

On the basis of triaxial data outputted separately by an acceleration sensor of the gravitational direction vector (1) and an angular velocity sensor, tracking a gravitational direction on the sensor coordinate system can be estimated.

The horizontal reference direction vector (2) can be estimated by tracking a horizontal reference direction on the basis of data outputted by an acceleration sensor, an angular velocity sensor, and a magnetic sensor.

Non Patent Literature 1, for example, specifically discloses a technique of tracking a gravitational orientation vector and a horizontal reference direction vector. There has also been known a technique based on a so-called attitude and heading reference system (AHRS).

For the travel direction vector (3), technical issues to be considered greatly differ between (i) the case in which the self-contained sensing device is fixed to, for example, a foot or lower back of a walker as a moving body and (ii) the case in which the self-contained sensing device is built in a terminal and the posture in which the walker holds the terminal changes freely.

For instance, in the case where the self-contained sensing device is fixed, it has a fixed positional relationship with the walker. This makes the travel direction of the moving body generally already known, thereby makes it relatively easy to track a travel direction. On the other hand, in the case where the self-contained sensing device is held at a position and in a posture that freely change, it is not easy to track a travel direction.

In view of the above, there have been proposed various methods for estimating a travel direction (Patent Literatures 1 and 2). Those methods have, however, failed to estimate a travel direction accurately.

Non Patent Literature 2 discloses that a person's walk motion has an acceleration component and an angular velocity component that have frequency characteristic patterns as shown in Table 1 below as the acceleration vector (triaxial) and angular velocity vector (triaxial) are correctly divided into (i) a component in a travel direction, (ii) a component in a vertical direction (gravitational direction), and (iii) a component in a side-to-side direction (lateral direction) orthogonal to the travel direction and vertical direction.

TABLE 1

|  | Acceleration component | Angular velocity component |
| --- | --- | --- |
| Vertical direction axis (yaw axis) | Walk frequency | Walk frequency × ½ |
| Side-to-side direction axis (pitch axis) | Walk frequency × ½ | Walk frequency |
| Travel direction axis (roll axis) | Walk frequency | Walk frequency × ½ |

In other words, in the case where an acceleration vector and an angular velocity vector can each be divided into different components in such a manner as to satisfy the characteristics shown in Table 1, those directions can be regarded as an optimal travel direction and an optimal side-to-side direction (lateral direction).

Non Patent Literature 2, however, merely suggests, as an algorithm for estimating a travel direction, continuously changing the azimuth by a necessary resolving power. Non Patent Literature 2 thus fails to disclose any specific method corresponding to such a suggestion.

Patent Literature 3 discloses, for example, a device and the like for comparing (i) characteristic patterns of acceleration, angular velocity, and the like arising from a typical walk motion of a human being's in such directions as the travel direction with (ii) actual measurement data to estimate a travel direction of the walk motion. Patent Literature 4 discloses a technique that, to identify a person's action, utilizes a cross-correlation between acceleration and angular velocity or a phase difference in a frequency domain.

CITATION LIST

Patent Literature 1
Japanese Patent Application Publication, Tokukai, No. 2009-156660 A
Patent Literature 2
Japanese Patent Application Publication, Tokukai, No. 2011-237452 A
Patent Literature 3
Japanese Patent Application Publication, Tokukai, No. 2011-245285 A
Patent Literature 4
Japanese Patent Application Publication, Tokukai, No. 2012-145457 A
Non Patent Literature 1
*Indoor positioning system using a self-contained sensor module for pedestrian navigation and its evaluation*, Symposium on Mobile Interactions 2008, proceedings, pp. 151-156 (2008)
Non Patent Literature 2
*Indoor/Outdoor positioning of handheld devices based on pedestrian dead reckoning*, IEICE Technical Report MVE2010-96, pp. 171-176 (2011)

SUMMARY OF INVENTION

Technical Problem

In the case where a self-contained sensing device is being held by a moving body, for instance, in the case where it is being held in a hand of a person walking while swinging his or her arms, changes occur in (i) the position at which the self-contained sensing device is held and (ii) the posture of the moving body. This means that the self-contained sensing device has a variable positional relationship with the moving body. In such a case, it is problematically difficult to correctly estimate the travel direction of the moving body with use of the self-contained sensing device.

The present invention has been accomplished to solve the above problem. It is an object of the present invention to provide a device and a method each of which allows accurate estimation of a travel direction of a moving body.

Solution to Problem

In order to solve the above problem, a travel direction estimating device of the present invention includes: an acceleration measuring section for measuring an acceleration vector component of the moving body so as to generate acceleration vector component data; an angular velocity measuring section for measuring an angular velocity vector component of the moving body so as to generate angular velocity vector component data; a gravitational direction vector estimating section for estimating a gravitational direction vector of the moving body on a basis of the acceleration vector component data and the angular velocity vector component data; a tentative travel direction vector generating section for generating a tentative travel direction vector and a side-to-side direction vector on a basis of the gravitational direction vector outputted by the gravitational direction vector estimating section; a walk frequency calculation section for (i) calculating component data resulting from projecting, for the gravitational direction vector, the acceleration vector component data remaining after removing the gravitational direction vector from an acceleration component data and (ii) outputting a frequency domain component of the calculated component data so as to determine a walk frequency and a phase of a frequency component of the walk frequency; a computing section for, (i) on a basis of the tentative travel direction vector, the gravitational direction vector, and the acceleration vector component data, calculating component data resulting from projecting, for the tentative travel direction vector, the acceleration vector component data remaining after removing a gravitational acceleration vector from the acceleration vector component data and (ii) outputting a frequency domain component of the calculated component data; a computing section for, (i) on a basis of the gravitational direction vector, the side-to-side direction vector, and the acceleration vector component data, calculating component data resulting from projecting, for the side-to-side direction vector, the acceleration vector component data remaining after removing the gravitational acceleration vector from the acceleration vector component data and (ii) outputting a frequency domain component of the calculated component data; a computing section for, (i) on a basis of the tentative travel direction vector and the angular velocity vector component data, calculating a component resulting from projecting the angular velocity vector component data onto the tentative travel direction vector and (ii) outputting a frequency domain component of the calculated component; a computing section for, (i) on a basis of the side-to-side direction vector and the angular velocity vector component data, calculating a component resulting from projecting the angular velocity vector component data onto the side-to-side direction vector and (ii) outputting a frequency domain component of the calculated component; and a travel direction vector determining section for, (i) on a basis of the walk frequency, the frequency domain component resulting from projecting an acceleration component travel direction vector, the frequency domain component resulting from projecting an acceleration component side-to-side direction vector, the frequency domain component resulting from projecting an angular velocity travel direction vector, and the frequency domain component resulting from projecting an angular velocity side-to-side direction vector, calculating a power value from the frequency component of the walk frequency or a frequency component of a half of the walk frequency so as to calculate an objective function, (ii) from the frequency domain component resulting from projecting the acceleration component travel direction vector, calculating the phase of the frequency component of the walk frequency so as to calculate a phase difference between the phase of the frequency component of the walk frequency and a phase of the walk frequency calculated by the walk frequency calculation section, (iii) in a case where the phase difference falls within a predetermined range, selecting as a candidate at least one tentative travel direction vector having a value of the objective function, and (iv) outputting, as a travel direction vector out of the at least one tentative travel direction vector as the candidate, a tentative travel direction vector that maximizes the value of the objective function.

In order to solve the above problem, a travel direction estimating method of the present invention includes: a first step of measuring an acceleration vector component and an angular velocity vector component of the moving body so as to generate acceleration vector component data and angular velocity vector component data; a second step of estimating a gravitational direction vector of the moving body on a basis of the acceleration vector component data and the angular velocity vector component data both generated in the first step; a third step of generating a tentative travel direction vector and a side-to-side direction vector on a basis of the gravitational direction vector estimated in the second step; a fourth step of calculating component data resulting from projecting, for the gravitational direction vector, the acceleration vector component data remaining after removing the gravitational direction vector estimated in the second step from the acceleration vector component data generated in the first step and (ii) outputting a frequency domain component of the calculated component data so as to determine a walk frequency and a phase of a frequency component of the walk frequency; a fifth step of, (i) on a basis of the tentative travel direction vector generated in the third step, the gravitational direction vector estimated in the second step, and the acceleration vector component data generated in the first step, calculating component data resulting from projecting, for the tentative travel direction vector, the acceleration vector component data remaining after removing a gravitational acceleration vector from the acceleration vector component data and (ii) determining a frequency domain component of the calculated component data; a sixth step of, (i) on a basis of the gravitational direction vector estimated in the second step, the side-to-side direction vector generated in the third step, and the acceleration vector component data generated in the first step, calculating component data resulting from projecting, for the side-to-side direction vector, the acceleration vector component data remaining after removing the gravitational acceleration vector from the acceleration vector component data and (ii) determining a frequency domain component of the calculated component data; a seventh step of, (i) on a basis of the tentative travel direction vector generated in the third step and the angular velocity vector component data generated in the first step, calculating a component resulting from projecting the angular velocity vector component data onto the tentative travel direction vector and (ii) determining a frequency domain component of the calculated component; an eighth step of, (i) on a basis of the side-to-side direction vector generated in the third step and the angular velocity vector component data generated in the first step, calculating a component resulting from projecting the angular velocity vector component data onto the side-to-side direction vector and (ii) determining a frequency domain component of the calculated component; and a ninth step of, (i) on a basis of the walk frequency determined in the fourth step, the frequency domain component, determined in the fifth step, resulting from projecting the acceleration vector component data onto the tentative travel direction vector, the frequency domain component, determined in the sixth step, resulting from projecting the acceleration vector component data onto the side-to-side direction vector, the frequency domain component, determined in the seventh step, resulting from projecting the angular velocity vector component data onto the tentative travel direction vector, and the frequency domain component, determined in the eighth step, resulting from projecting the angular velocity vector component data onto the side-to-side direction vector, calculating a power value from the frequency component of the walk frequency or a frequency component of a half of the walk frequency so as to calculate an objective function, (ii) from the frequency domain component resulting from projecting the acceleration vector component data onto the travel direction vector, calculating the phase of the frequency component of the walk frequency so as to calculate a phase difference between the phase of the frequency component of the walk frequency and a phase of the walk frequency calculated by the walk frequency calculation section, (iii) in a case where the phase difference falls within a predetermined range, selecting as a candidate at least one tentative travel direction vector having a value of the objective function, and (iv) determining, as a travel direction vector out of the at least one tentative travel direction vector as the candidate, a tentative travel direction vector that maximizes the value of the objective function.

Advantageous Effects of Invention

The travel direction estimating device and travel direction estimating method of the present invention each allow accurate estimation of a travel direction even in the case where changes occur in (i) the position at which the self-contained sensing device is held and (ii) and the posture in which it is held and the self-contained sensing device has a variable positional relationship with the moving body.

DESCRIPTION OF EMBODIMENTS (First Embodiment)

The description below deals with a first embodiment of the present invention with reference to drawings.

Figure 1:
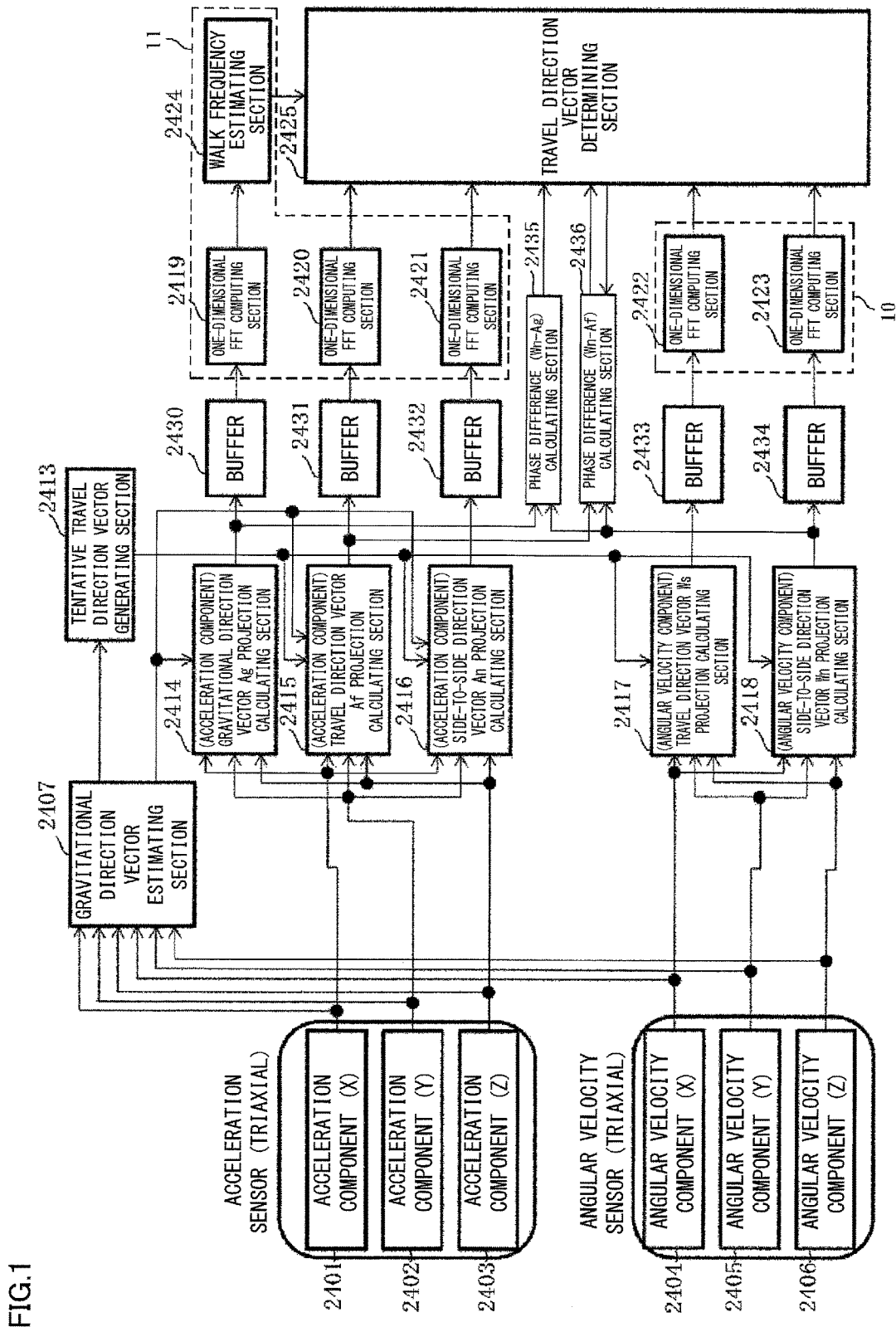
FIG. 1 is a block diagram illustrating a basic configuration of a device of a first embodiment of the present invention for estimating a travel direction of a moving body.

FIG. 1 is a functional block diagram illustrating a basic configuration of a device of the first embodiment of the present invention for estimating a travel direction of a moving body.

The travel direction estimating device illustrated in FIG. 1 includes, as measuring sections, an acceleration sensor (triaxial) 2401, 2402, 2403 and an angular velocity sensor (triaxial) 2404, 2405, 2406 both mounted in a terminal device, such as a smartphone or portable terminal, attached to or held by a moving body (for example, a walker). The above sensors do not necessarily produce their respective outputs on an identical coordinate system. Their outputs are, however, subjected to a coordinate transformation to be eventually transformed into coordinates that can be handled on an identical rectangular coordinate system (on X, Y, and Z axes).

The acceleration sensor includes an acceleration component (x) 2401, an acceleration component (y) 2402, and an acceleration component (z) 2403, which (i) measure vector components for acceleration along the X axis, the Y axis, and the Z axis respectively on a sensor coordinate system whose relation of a relative attitude angle to a moving body is already known and which (ii) output the measurement data. Similarly, the angular velocity sensor 2404, 2405, 2406 measure angular velocity components along the X axis, the Y axis, and the Z axis respectively and output the measurement data. The acceleration vector component data and the angular velocity vector component data are not necessarily component data itself as outputted by the sensors. The travel direction estimating device may, for instance, (i) perform a process of calibrating an offset or sensitivity for an acceleration vector and angular velocity vector and (ii) output such calibrated data. To perform such a process, the travel direction estimating device may separately contain a temperature sensor for performing a process of calibration for temperature compensating.

The travel direction estimating device includes a gravitational direction vector estimating section 2407, which is a processing section for (i) receiving acceleration components (triaxial) and angular velocity components (triaxial) and (ii) estimating a gravitational direction vector of a moving body to output data on the gravitational direction vector. Such a process can be performed with use of a conventional technique.

The travel direction estimating device includes a tentative travel direction vector generating section 2413, which is a processing section for (i) receiving an output of the gravitational direction vector estimating section 2407 and (ii) generating a tentative travel direction vector group in correspondence with a necessary resolving power, which tentative travel direction vector group is a group of candidates for a travel direction vector orthogonal to the gravitational direction vector. A person's move on foot, in most cases, has a travel direction vector parallel to a plane on which the person walks. The travel direction vector can thus be regarded as orthogonal to the gravitational direction vector. This makes it possible to select, on the basis of the gravitational direction vector, any one travel direction orthogonal to the vertical direction as a candidate. The tentative travel direction vector generating section 2413, in the case where, for instance, it needs a resolving power that allows 0.5-degree steps, generates 720 (=360 degrees/0.5 degree) tentative travel direction vectors.

Determining a tentative travel direction vector in turn makes it possible to determine a direction vector (unit vector) orthogonal to both the tentative travel direction vector and the vertical direction (gravitational direction). The description herein refers to such an orthogonal direction vector as a tentative side-to-side direction vector. The tentative travel direction vector generating section 2413, as it generates a travel direction vector, calculates a vector product of the travel direction vector generated and the gravitational direction vector to simultaneously generate a side-to-side direction vector. This means that in the case where the tentative travel direction vector generating section 2413 generates 720 tentative travel direction vectors, it also generates 720 corresponding side-to-side direction vectors.

The travel direction estimating device includes an (acceleration component) gravitational direction vector Ag projection calculating section 2414, which (i) receives an acceleration vector (triaxial) and an output of the gravitational direction vector estimating section 2407, (ii) calculates the size of a component of a motion acceleration vector remaining after subtracting a gravitational acceleration vector (=1 G) from the acceleration vector which component is projected for a gravitational direction vector, and (iii) outputs the calculation result.

The travel direction estimating device includes an (acceleration component) travel direction vector Af projection calculating section 2415, which (i) receives an acceleration vector (triaxial), an output of the gravitational direction vector estimating section 2407, and an output of the tentative travel direction vector generating section 2413, (ii) calculates the size of a component resulting from projecting a motion acceleration vector, remaining after removing a gravitational acceleration vector from the acceleration vector, for a travel direction vector outputted by the tentative travel direction vector generating section 2413, and (iii) outputs the calculation result.

The travel direction estimating device includes an (acceleration component) side-to-side direction vector An projection calculating section 2416, which (i) receives an acceleration vector (triaxial), an output of the gravitational direction vector estimating section 2407, and an output of the tentative travel direction vector generating section 2413, (ii) calculates the size of a component resulting from projecting a motion acceleration vector, remaining after removing a gravitational acceleration vector from the acceleration vector, for a side-to-side direction vector outputted by the tentative travel direction vector generating section 2413, and (iii) outputs the calculation result.

The travel direction estimating device includes an (angular velocity component) travel direction vector Ws projection calculating section 2417, which (i) receives an angular velocity vector (triaxial) and an output of the tentative travel direction vector generating section 2413, (ii) calculates the size of a component resulting from projecting the angular velocity vector for the travel direction vector, and (iii) outputs the calculation result.

The travel direction estimating device includes an (angular velocity component) side-to-side direction vector Wn projection calculating section 2418, which (i) receives an angular velocity vector (triaxial) and an output of the tentative travel direction vector generating section 2413, (ii) calculates the size of a component resulting from projecting the angular velocity vector for the side-to-side direction vector, and (iii) outputs the calculation result.

Specifically, the (angular velocity component) side-to-side direction vector Wn projection calculating section 2418 calculates an angular velocity component Wn in the side-to-side direction on the basis of one of the three equations [Math. 1] to [Math. 3] below.

$$\begin{bmatrix} \vec{v}_x = (\vec{g} \times \vec{x}) \times \vec{g} \\ W_n = \vec{\omega} \cdot \vec{v}_x / |\vec{v}_x| \end{bmatrix} \text{ where } \vec{x} = (1, 0, 0) \quad [\text{Math. 1}]$$

$$\begin{bmatrix} \vec{v}_y = (\vec{g} \times \vec{y}) \times \vec{g} \\ W_n = \vec{\omega} \cdot \vec{v}_y / |\vec{v}_y| \end{bmatrix} \text{ where } \vec{y} = (0, 1, 0) \quad [\text{Math. 2}]$$

$$\begin{bmatrix} \vec{v}_z = (\vec{g} \times \vec{z}) \times \vec{g} \\ W_n = \vec{\omega} \cdot \vec{v}_z / |\vec{v}_z| \end{bmatrix} \text{ where } \vec{z} = (0, 0, 1) \quad [\text{Math. 3}]$$

In the three equations [Math. 1] to [Math. 3] above, the g vector indicates a gravitational orientation vector and has a component ($g_x$, $g_y$, $g_z$), and the ω vector indicates an angular velocity vector and has a component ($\omega_x$, $\omega_y$, $\omega_z$).

The (angular velocity component) side-to-side direction vector Wn projection calculating section 2418 determines an angular velocity component Wn in the side-to-side direction by calculating one of the three equations above which corresponds to that one of the X, Y, and Z axes on the sensor coordinate system of the travel direction estimating device which is the closest to the side-to-side direction of the travel direction estimating device during its travel period. Thus, the (angular velocity component) side-to-side direction vector Wn projection calculating section 2418, in the case where, for instance, it has understood in advance that the Z axis is the closest to the side-to-side direction, calculates the angular velocity component Wn in the side-to-side direction on the basis of the equation [Math. 3].

Note that in the case where the gravitational orientation vector becomes close to such an axis direction determined in advance, that is, in the case where the vector $v_{x,y,z}$ has a size so small as to be not more than a certain threshold, the (angular velocity component) side-to-side direction vector Wn projection calculating section 2418 determines an alternative axis in advance and recalculates the angular velocity component Wn in the side-to-side direction on the basis of a component using that axis.

For instance, assuming that the axis determined in advance is the Z axis and that the alternative axis is the X axis, (i) in the case where the vector $v_z$ has a size of a certain threshold or above, the (angular velocity component) side-to-side direction vector Wn projection calculating section 2418 calculates the angular velocity component Wn in the side-to-side direction on the basis of the equation [Math. 3], and (ii) in the case where the vector $v_z$ has a size of less than the certain threshold, the (angular velocity component) side-to-side direction vector Wn projection calculating section 2418 calculates the angular velocity component Wn in the side-to-side direction on the basis of the equation [Math. 1].

As a specific example, a smartphone or the like is used as its sensing section. In such an example, in the case where a person is normally holding a smartphone, the axis (Z axis) perpendicular to the principal plane (screen) of the smartphone typically coincides with a rotation axis on which the person swings an arm holding the smartphone. The above axis determined in advance is thus the Z axis in this example.

The person may swing an arm holding the smartphone with its screen facing downward. Even in such a case, the person is most likely holding the smartphone in a hand at the short sides of the screen and swings an arm holding the smartphone. This indicates that the short-side axis should serve as the alternative axis and sets as the X axis.

The travel direction estimating device includes a buffer 2430, which is a one-dimensional buffer for storing an output of the (acceleration component) gravitational direction vector projection calculating section 2414. While a buffer typically buffers data in a FIFO manner, the buffer 2430 simply needs to be capable of retaining a temporal storage order. This applies also to buffers 2430 to 2434 described below.

The travel direction estimating device further includes (i) a buffer 2431, which is a one-dimensional buffer for storing an output of the (acceleration component) travel direction vector projection calculating section 2415, (ii) a buffer 2432, which is a one-dimensional buffer for storing an output of the (acceleration component) side-to-side direction vector projection calculating section 2416, (iii) a buffer 2433, which is a one-dimensional buffer for storing an output of the (angular velocity component) travel direction vector projection calculating section 2417, and (iv) a buffer 2434, which is a one-dimensional buffer for storing an output of the (angular velocity component) side-to-side direction vector projection calculating section 2418.

Figure 2:
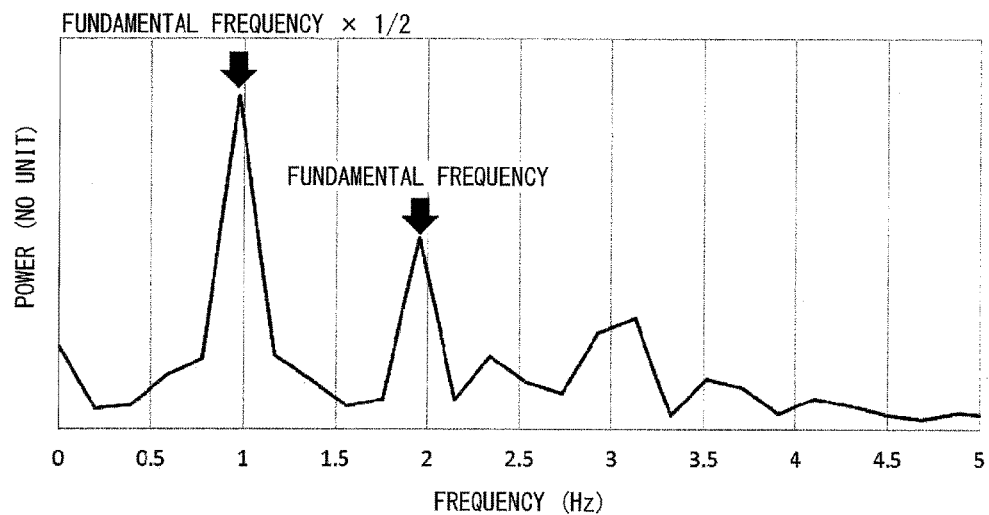
FIG. 2 is a graph illustrating a power spectrum of an acceleration component Ag in a gravitational direction.

The travel direction estimating device includes a one-dimensional FFT computing section 2419, which is a device for (i) performing a one-dimensional discrete Fourier transform computation on sample data with a predetermined length (for example, 512 samples) on the basis of acceleration component data stored in the buffer 2430 and (ii) outputting data converted into a frequency domain. The one-dimensional FFT computing section 2419, in other words, performs a one-dimensional discrete Fourier transform computation to calculate a peak frequency of a power spectrum of an acceleration component the data on which is stored in the buffer 2430. FIG. 2 illustrates an example of such a power spectrum.

The one-dimensional FFT computing section 2419 needs information on a sampling frequency to correctly determine a frequency through discrete Fourier transform. Such data may be retained in the buffer 2430 when it stores acceleration component data, or may be obtained by reading information stored in advance in an external memory device. This applies also to one-dimensional FFT computing sections 2419 to 2423 described below.

The travel direction estimating device includes a one-dimensional FFT computing section 2420, which is a device for (i) performing a one-dimensional discrete Fourier transform computation on sample data with a predetermined length on the basis of acceleration component data stored in the buffer 2431 and (ii) outputting data converted into a frequency domain.

Figure 3:
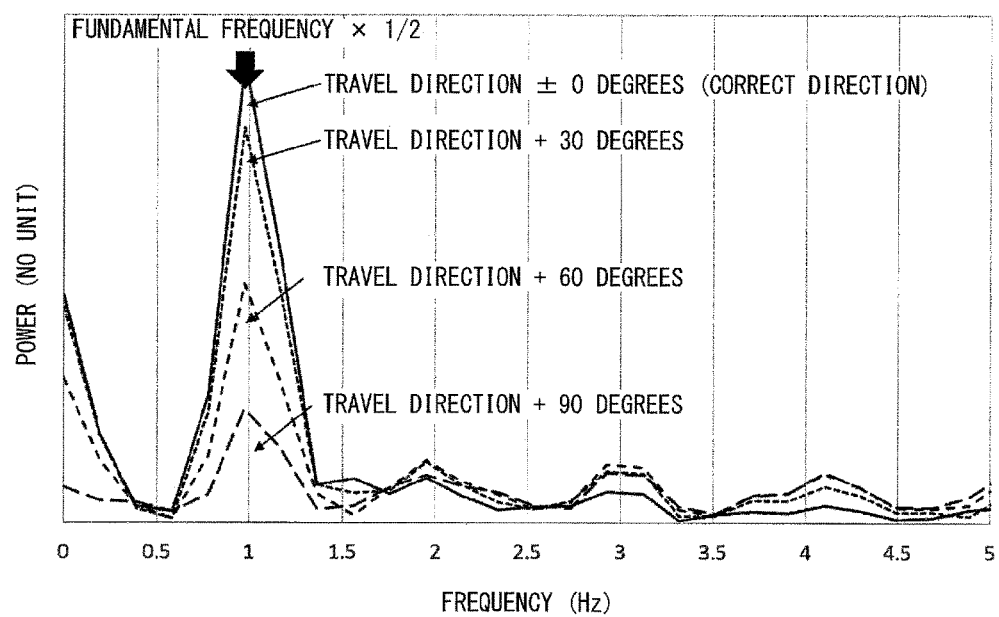
FIG. 3 is a diagram illustrating power spectrums of an acceleration component Af in tentative travel directions.

FIG. 3 illustrates an example of such data. As illustrated in FIG. 3, the power spectrum of an acceleration component Af in the travel direction has a horizontal axis indicative of the frequency (Hz) and a vertical axis indicative of the power (no unit). FIG. 3 shows that the power spectrum has a peak at a frequency of 1 Hz, which is half the basic frequency (fundamental frequency) of a person's walk.

The travel direction estimating device includes a one-dimensional FFT computing section 2421, which is a device for (i) performing a one-dimensional discrete Fourier transform computation on sample data with a predetermined length on the basis of acceleration component data stored in the buffer 2432 and (ii) outputting data converted into a frequency domain.

Figure 4:
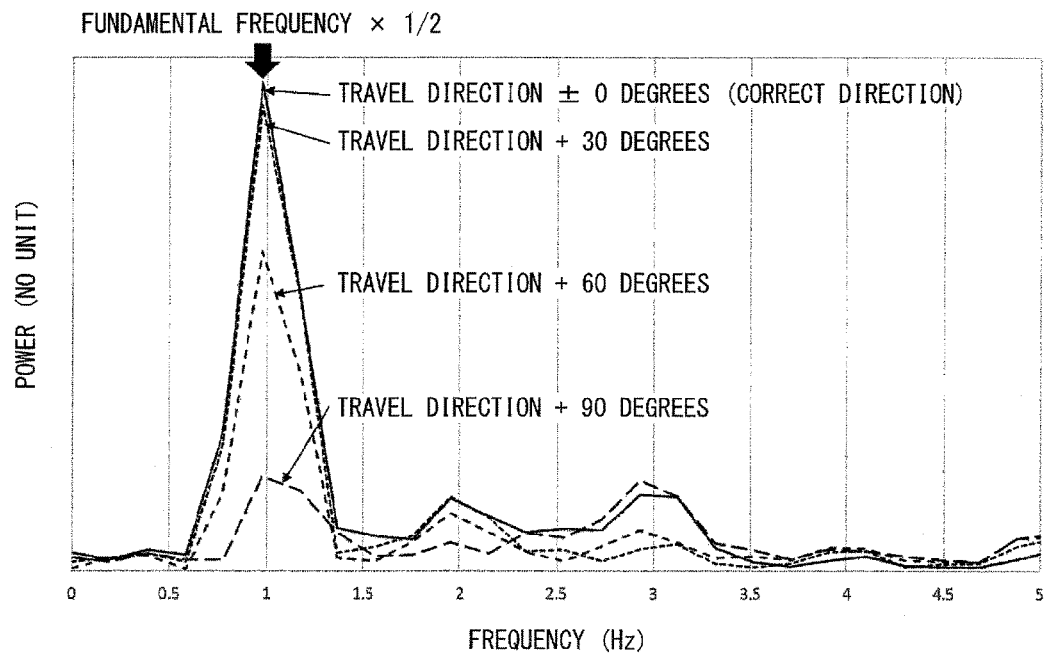
FIG. 4 is a graph illustrating power spectrums of an angular velocity component Ws on axes of tentative travel directions.

The travel direction estimating device includes a one-dimensional FFT computing section 2422, which is a device for (i) performing a one-dimensional discrete Fourier transform computation on sample data with a predetermined length on the basis of angular velocity component data stored in the buffer 2433 and (ii) outputting data converted into a frequency domain. FIG. 4 illustrates an example of such data.

Figure 5:
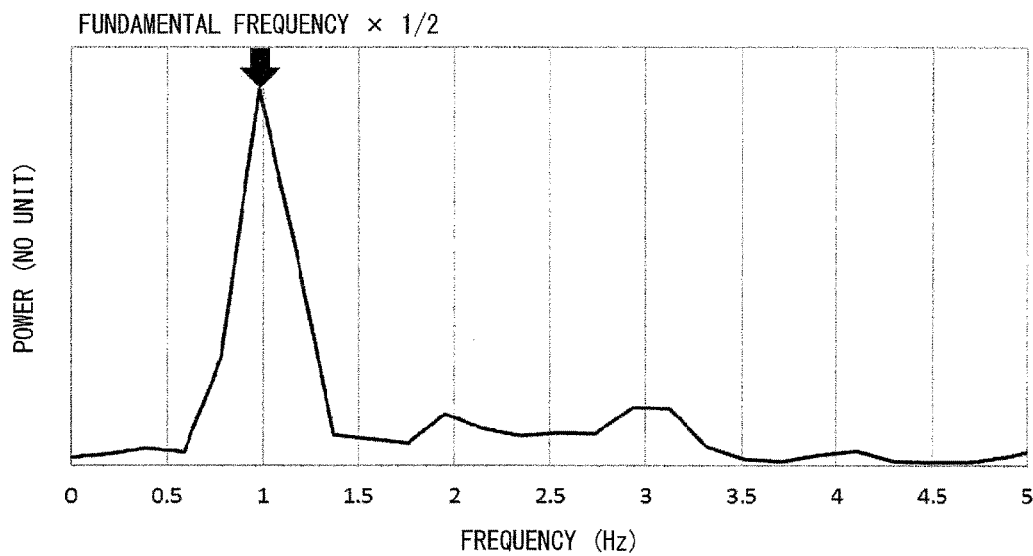
FIG. 5 is a graph illustrating a power spectrum of an angular velocity component Wn about the axis (screen axis) of a side-to-side direction.

The travel direction estimating device includes a one-dimensional FFT computing section 2423, which is a device for (i) performing a one-dimensional discrete Fourier transform computation on sample data with a predetermined length on the basis of angular velocity component data stored in the buffer 2434 and (ii) outputting data converted into a frequency domain. FIG. 5 illustrates an example of such data.

The travel direction estimating device includes a walk frequency estimating section 2424, which (i) estimates a fundamental frequency of a walk motion on the basis of an output of the one-dimensional FFT computing section 2419 and (ii) outputs the walk frequency (fundamental frequency) estimated. The fundamental frequency of a walk motion can basically be estimated as follows: In the case where there is a characteristic frequency peak within the range of a cycle of a walk motion of a normal person (about 0.5 to 1.5 seconds for one step; that is, 0.7 to 3.0 Hz), the walk frequency estimating section 2424 can determine that such a frequency is the walk frequency. Alternatively, the walk frequency estimating section 2424 may (i) detect a walk motion in a time domain in units of steps to estimate a walk frequency of the walk motion and (ii) detect a corresponding frequency peak in a frequency domain to determine the walk frequency from time intervals of the frequency peak. A walk motion can be detected in a time domain through, for example, a method disclosed in U.S. Pat. No. 4,243,684. The walk frequency estimating section 2424, after estimating a walk frequency, determines a phase H0 of the frequency peak of the walk frequency and outputs the phase H0 together with the walk frequency.

In FIG. 1, the one-dimensional FFT computing section 2422 and the one-dimensional FFT computing section 2423 constitute a discrete Fourier transform section (angular velocity triaxial component) 10. Further, in FIG. 1, the one-dimensional FFT computing section 2419, the one-dimensional FFT computing section 2420, the one-dimensional FFT computing section 2421, and the walk frequency estimating section 2424 constitute a discrete Fourier transform section (acceleration triaxial component) 11.

The travel direction estimating device includes a phase difference (Wn–Ag) calculating section 2435, which receives an output of the (angular velocity component) side-to-side direction vector Wn projection calculating section 2418 and an output of the (acceleration component) gravitational direction vector Ag projection calculating section 2414 to calculate a phase difference between the two outputs on a time axis.

The travel direction estimating device includes a phase difference (Wn–Af) calculating section 2436, which receives an output of the (angular velocity component) side-to-side direction vector Wn projection calculating section 2418 and an output of the (acceleration component) travel direction vector Af projection calculating section 2415 to calculate a phase difference between the two outputs on a time axis.

The travel direction estimating device includes a travel direction vector determining section 2425. The travel direction vector determining section 2425 receives an output (walk frequency) of the walk frequency estimating section 2424, respective outputs of the one-dimensional FFT computing sections 2420 to 2423, and respective outputs of the phase difference (Wn–Ag) calculating section 2435 and the phase difference (Wn–Af) calculating section 2436. The travel direction vector determining section 2425 firstly determines a power value P1 and phase H1 of a walk frequency of a travel direction component of the acceleration vector on the basis of the output of the one-dimensional FFT computing section 2420 illustrated in FIG. 3. The travel direction vector determining section 2425 also determines a power value P2 and phase H2 of a half of a walk frequency (that is, the frequency half the walk frequency) of a side-to-side direction component of the acceleration vector on the basis of the output of the one-dimensional FFT computing section 2421. The travel direction vector determining section 2425 also determines a power value P3 and phase H3 of a half of a walk frequency of a travel direction component of the angular velocity vector on the basis of the output of the one-dimensional FFT computing section 2422 illustrated in FIG. 4. The travel direction vector determining section 2425 also determines a power value P4 and phase H4 of a walk frequency of a side-to-side direction component of the angular velocity vector on the basis of the output of the one-dimensional FFT computing section 2423 illustrated in FIG. 5.

The travel direction vector determining section 2425 (i) defines an objective function U (P1, P2, P3, P4) for comprehensively evaluating the four power values above and (ii) determines a tentative travel direction vector that maximizes the objective function.

That is, in the case where the travel direction vector determining section 2425 has determined a tentative travel direction vector and a tentative side-to-side direction vector, the components resulting from projecting the acceleration vector in the two directions should each have a maximum value at (i) a power value of a walk frequency resulting from converting the tentative travel direction vector component through one-dimensional discrete Fourier transform or the like into a component in a frequency domain and (ii) a power value of a half of a walk frequency resulting from converting the tentative side-to-side direction component into a component in a frequency domain (see Table 1).

In the case where a component of a tentative travel direction vector Af has been transformed through one-dimensional discrete Fourier transform or the like into a component in a frequency domain, the resulting walk frequency has a power spectrum that varies in size according to the tentative travel direction as illustrated in FIG. 3, for example. The travel direction vector determining section 2425 estimates that a tentative travel direction corresponding to the maximum size of the power spectrum is the correct travel direction. The graph of FIG. 3 only shows, as examples, lines indicative of the angles of shift of 0 degrees, 30 degrees, 60 degrees, and 90 degrees from the direction that the travel direction vector determining section 2425 has estimated as the correct travel direction.

A component resulting from projecting the angular velocity vector for a tentative travel direction vector should have a maximum value at a power value of a half of a walk frequency. A component resulting from projecting the angular velocity vector for a tentative side-to-side direction vector should have a maximum value at a power value of a walk frequency.

In the case where the angular velocity vector is projected for a tentative travel direction vector, the resulting angular velocity component Ws has a power spectrum that varies in size according to the tentative travel direction as illustrated in FIG. 4, for example. The travel direction vector determining section 2425 estimates that a tentative travel direction corresponding to the maximum size of the power spectrum is the correct travel direction. The graph of FIG. 4 only shows, as examples, lines indicative of the angles of shift of 0 degrees, 30 degrees, 60 degrees, and 90 degrees from the direction that the travel direction vector determining section 2425 has estimated as the correct travel direction.

By the means, power values to be maximized about the four components above are obtained. Thus, calculating a weighted summation of the individual power values allows a calculation of an objective function to be optimized.

The objective function is, for example, U (P1, P2, P3, P4)=w1P1+w2P2+w3P3+w4P4, where w1, w2, w3, and w4 are weight coefficients. Such an objective function is maximized by two solutions: a degrees as the correct travel direction and a+180 degrees. The travel direction vector determining section 2425 can thus verify, on the basis of a phase difference (that is, the phase difference between different components) of the acceleration vector or angular velocity vector, which of the two solutions is the true solution. The utilizable combinations of a phase difference are, for example, the angular velocity component Wn in the side-to-side direction and an acceleration component Ag in the gravitational direction or the angular velocity component Wn in the side-to-side direction and the acceleration component Af in the travel direction.

The travel direction vector determining section 2425 finally determines, as a travel direction, a solution with which, for example, the phase difference between the angular velocity component Wn in the side-to-side direction and the acceleration component Ag in the gravitational direction substantially falls within the range of 0 to 100 degrees. The determination of a direction will be described later in detail.

Figure 6:
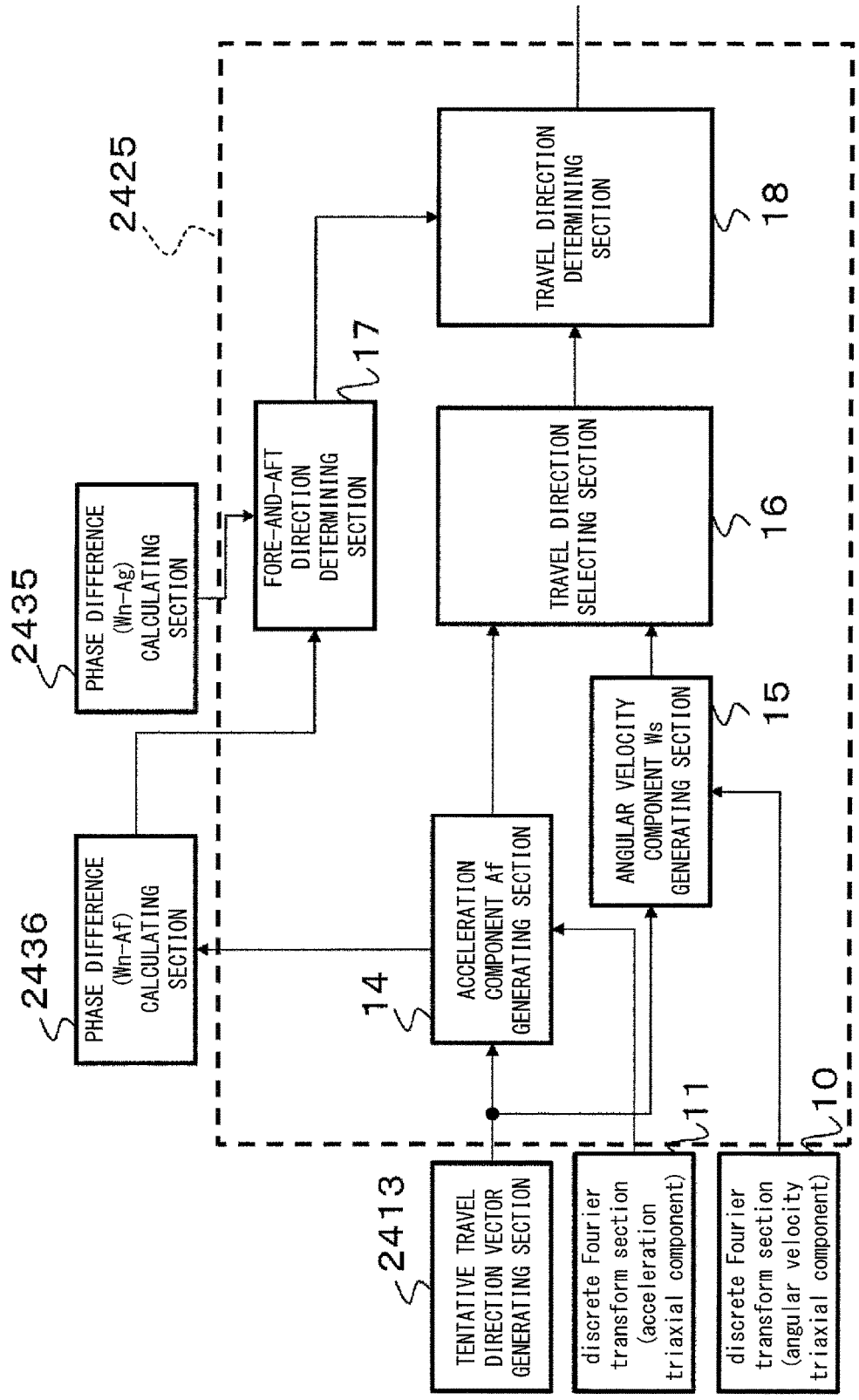
FIG. 6 is a block diagram illustrating an example configuration of the travel direction vector determining section shown in FIG. 1.

FIG. 6 is a block diagram illustrating an example configuration of the travel direction vector determining section 2425 shown in FIG. 1. The travel direction vector determining section 2425, as illustrated in FIG. 6, includes (i) an acceleration component (Af) generating section 14 for generating an acceleration component Af in a travel direction, (ii) an angular velocity component (Ws) generating section 15 for calculating an angular velocity component Ws about the axis of the travel direction, (iii) a travel direction selecting section 16, (iv) a fore-and-aft direction determining section 17, and (v) a travel direction determining section 18.

The acceleration component (Af) generating section 14 is connected to the tentative travel direction vector generating section 2413, the discrete Fourier transform section 11, the phase difference (Wn–Af) calculating section 2436, and the travel direction selecting section 16. The angular velocity component (Ws) generating section 15 is connected to the tentative travel direction vector generating section 2413, the discrete Fourier transform section 10, and the travel direction selecting section 16. The travel direction selecting section 16 is connected to the travel direction determining section 18. The fore-and-aft direction determining section 17 is connected to the phase difference (Wn–Ag) calculating section 2435, the phase difference (Wn–Af) calculating section 2436, and the travel direction determining section 18.

Figure 7:
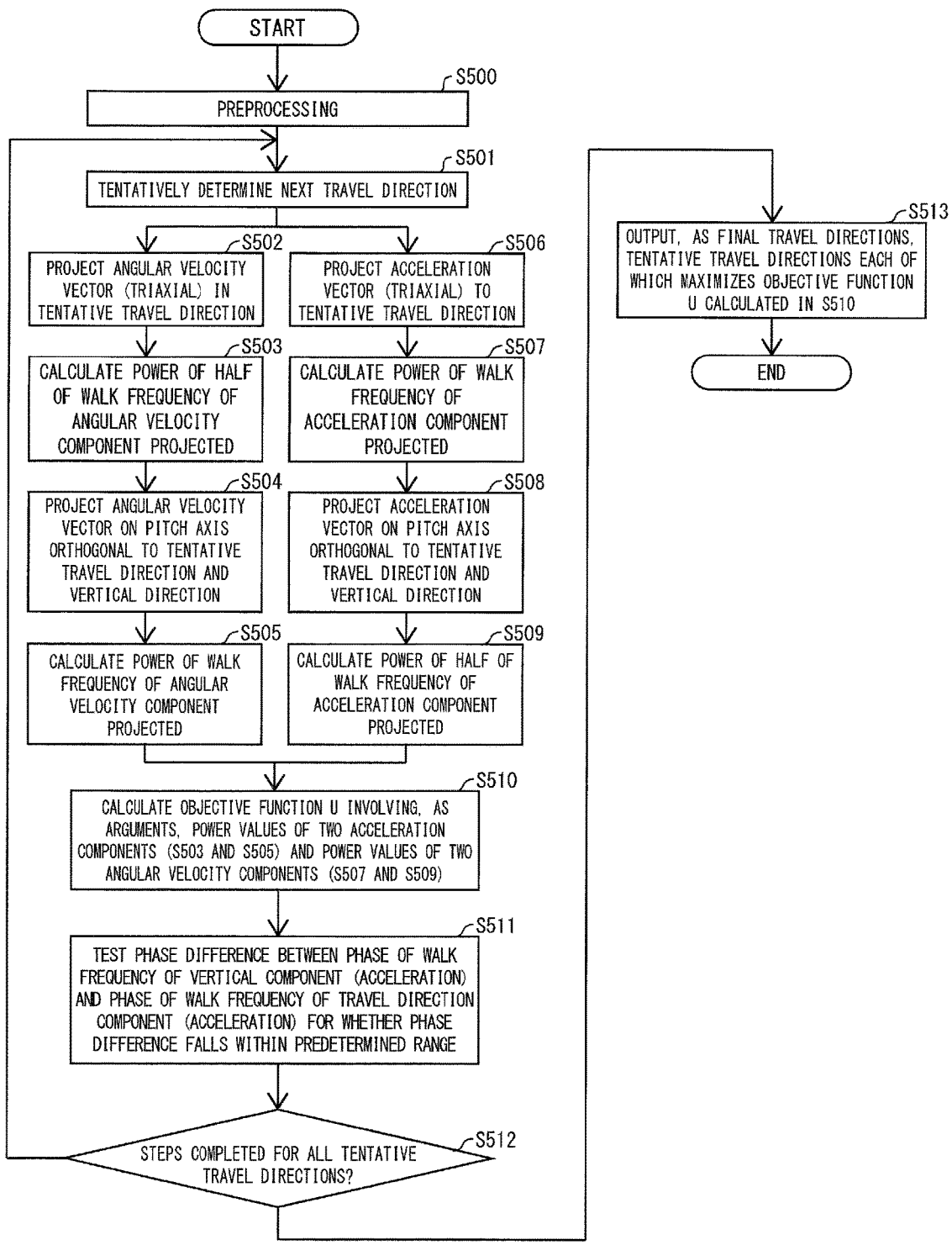
FIG. 7 is a flowchart illustrating a process that the device of the first embodiment of the present invention for estimating a travel direction of a moving body performs to estimate a travel direction.

FIG. 7 is a flowchart illustrating a process that the device of the first embodiment of the present invention for estimating a travel direction of a moving body performs to estimate a travel direction. The travel direction estimating device first performs a process of calculating necessary basic data as a preprocessing preceding the process of estimating a travel direction (step S500). This preprocessing will be described later in detail with reference to FIG. 8.

The tentative travel direction vector generating section 2413 is provided with (i) a resolving power (for example, 0.5-degree units) for estimation and (ii) a gravitational direction vector. The tentative travel direction vector generating section 2413 generates, by the 0.5-degree units, candidates for a travel direction vector orthogonal to the gravitational direction vector. The tentative travel direction vector generating section 2413 sequentially outputs one of those candidates (tentative travel direction vectors) (step S501).

The (angular velocity component) travel direction vector projection calculating section 2417 projects an angular velocity vector (triaxial) onto a tentative travel direction vector produced in S501 and thus obtains data on the size of the component (step S502). The component projected is stored in the buffer 2433 and is then transformed by the one-dimensional FFT computing section 2422 into data on a frequency domain.

The travel direction vector determining section 2425 determines a power value P3 and phase H3 of a frequency component of a half of a walk frequency f0 on the basis of the data calculated in the step S502 through a one-dimensional discrete Fourier transform computation process (step S503). The walk frequency f0 has been calculated in the step S500 as a preprocessing. The step S503 uses such a value calculated.

The (angular velocity component) travel direction vector projection calculating section 2418 (i) projects the angular velocity vector for a side-to-side direction vector (pitch axis) determined through computation of an outer product of the tentative travel direction vector and the gravitational direction vector and (ii) determines the size of the component (step S504). The component projected is stored in the buffer 2434 and is then transformed by the one-dimensional FFT computing section 2423 through a one-dimensional discrete Fourier transform computation process into data in a frequency domain.

The travel direction vector determining section 2425, on the basis of the one-dimensional discrete Fourier transform data as transformed in the step S504, (i) obtains the walk frequency f0 calculated in the step S500 and (ii) determines a power value P4 and phase H4 of a frequency component of the walk frequency (step S505).

The (acceleration component) travel direction vector projection calculating section 2415 (i) projects an acceleration vector (triaxial) onto the tentative travel direction vector provided in the step S501 and (ii) determines the size of the component (step S506). The component projected is stored in the buffer 2431 and is then transformed by the one-dimensional FFT computing section 2420 through a one-dimensional discrete Fourier transform computation process into data in a frequency domain.

The travel direction vector determining section 2425, on the basis of the one-dimensional discrete Fourier transform data as transformed in the step S506, (i) obtains the walk frequency calculated in the step S500 and (ii) determines a power value P1 and phase H1 of a frequency component of the walk frequency (step S507). In the case where there is no sufficiently high peak value in this range, the process may (i) assume that the walk frequency estimating section 2424 did not detected a walk motion and (ii) skip this step.

The (acceleration component) side-to-side direction vector projection calculating section 2416 (i) projects the acceleration vector (triaxial) for the side-to-side direction vector (pitch axis) determined through computation of an outer product of the tentative travel direction vector generated in the step S501 and the gravitational direction vector and (ii) determines the size of the component (step S508). The component projected is stored in the buffer 2432 and is then transformed by the one-dimensional FFT computing section 2421 through a one-dimensional discrete Fourier transform computation process into data in a frequency domain.

The travel direction vector determining section 2425, on the basis of the ne-dimensional discrete Fourier transform data as transformed in the step S508, (i) obtains the walk frequency calculated in the step S500 and (ii) determines a power value P2 and phase H2 of a frequency component of a half of the walk frequency (step S509).

The travel direction vector determining section 2425 calculates an objective function U (P1, P2, P3, P4) involving, as arguments, the power values determined in the respective steps S503, S505, S507, and S509 (step S510). The objective function is, for example, U (P1, P2, P3, P4)=w1P1+w2P2+w3P3+w4P4. In the case where the travel direction vector determining section 2425 calculates such an objective function, the weight coefficients are desirably the following combination: w1=w2=0.2, and w3=w4=0.8. The combination of weight coefficients is, however, not limited to the above.

The travel direction vector determining section 2425 (i) finds a phase difference H1–H0 between the phase H1 determined in the step S507 and the phase H0 determined in the step S500 and (ii) tests the phase difference for whether it falls within a predetermined range (step S511). Only in the case where the phase difference falls within such a predetermined range, the travel direction vector determining section 2425 determines that the tentative travel direction vector generated in the step S501 is acceptable as a candidate. The travel direction vector determining section 2425 may refer to values stored in an external memory device for use as specific values of the above range of the phase difference. The range of the phase difference is, for example, 0 to 100 degrees.

The travel direction vector determining section 2425 allows the process to proceed to (i) the step S513 in the case where the travel direction estimating device has finished performing the above steps, at the target resolving power, on all the combinations involving the tentative travel direction vectors generated and outputted in the step S501 or to (ii) the step S501 otherwise (step S512). In the case where, for instance, the travel direction estimating device determines a travel direction vector at a resolving power of 0.5-degree steps, the travel direction vector determining section 2425 allows the process to proceed to (i) the step S513 in the case where the travel direction estimating device has finished performing the above steps on all the combinations involving the 720 tentative travel direction vectors or to (ii) the step S501 otherwise.

The travel direction vector determining section 2425 (i) selects, from among the tentative travel direction vectors of all the combinations that have passed the phase difference test in the step S511, tentative travel direction vectors each of which maximizes the objective function U and (ii) determines that the tentative travel direction vectors selected are travel direction vectors (step S513). Since the objective function U is maximized by two solutions as described above, the travel direction vector determining section 2425 determines two travel direction vectors, one of which has the correct travel direction and the other of which has the opposite direction at 180 degrees from the correct travel direction.

The travel direction vector determining section 2425 may in an alternative embodiment determine a travel direction vector through a simple method of using the travel direction selecting section 16 shown in FIG. 6 to determine that a direction in which the power spectrum of an acceleration component Af in the tentative travel direction is at its maximum is the correct travel direction.

Such an embodiment may further use an angular velocity component Ws about the axis of the travel direction for increased accuracy in determining a travel direction vector. Specifically, the triaxial angular velocity sensor senses an angular velocity about the axis of a travel direction. The discrete Fourier transform section 10 then performs Fourier transform on the angular velocity. The resulting power spectrums of individual frequency components are supplied to the angular velocity component (Ws) generating section 15. The angular velocity component (Ws) generating section 15 calculates different components for respective travel directions tentatively determined by the tentative travel direction vector generating section 2413. The travel direction selecting section 16, in this case, determines the correct travel direction with further reference to a direction in which the angular velocity component Ws about the axis of the travel direction has a maximum power spectrum.

As described above, the travel direction selecting section 16 can use both an acceleration component Af and an angular velocity component Ws to estimate a travel direction with the highest accuracy. The travel direction selecting section 16 may alternatively use only one of an acceleration component Af and an angular velocity component Ws to estimate a travel direction.

Figure 8:
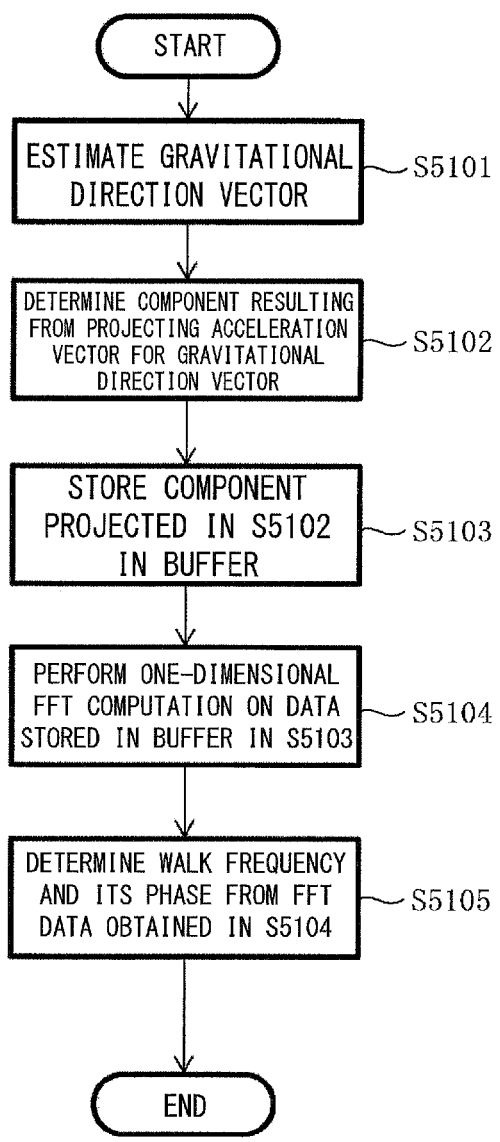
FIG. 8 is a flowchart illustrating details of the step S500 shown in FIG. 3.

FIG. 8 is a flowchart illustrating details of the step S500 shown in FIG. 7. The step S500 includes sub-steps S5101 to S5104 described below.

The gravitational direction vector estimating section 2407 receives an acceleration vector and an angular velocity vector to calculate a gravitational direction vector (step S5101). The (acceleration component) gravitational direction vector projection calculating section 2414 (i) projects a motion acceleration vector (remaining after removing a gravitational acceleration vector from the acceleration vector) for the gravitational direction vector calculated in the step S5101 and (ii) determines the size of the component (step S5102). The component determined in the step S5102 is stored in the buffer 2430 (step S5103). The one-dimensional FFT computing section 2419 performs a one-dimensional discrete Fourier transform computation process on the data row stored in the step S5103 and outputs discrete Fourier transform data as transformed in a frequency domain (step S5104).

The walk frequency estimating section 2424 (i) determines a peak frequency component on the basis of the discrete Fourier transform data outputted in the step S5104 and (ii) determines a walk frequency f0 (step S5105).

Figure 9:
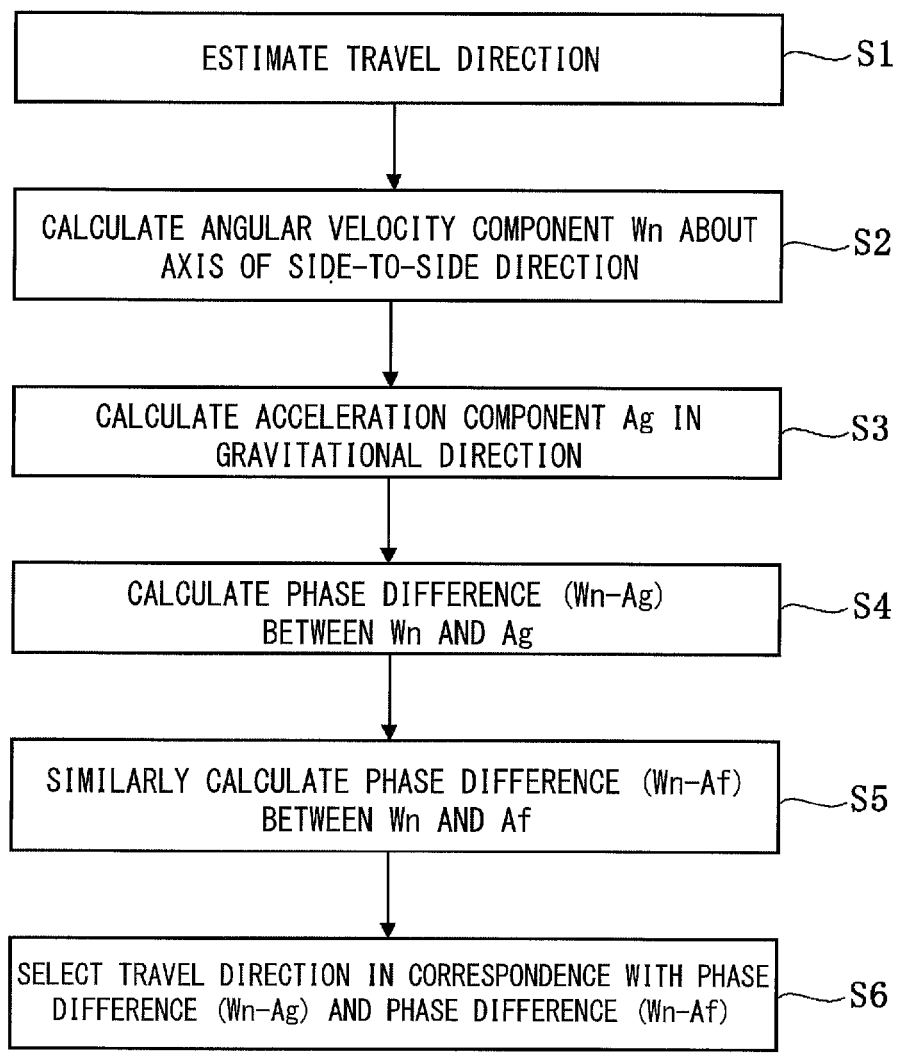
FIG. 9 is a flowchart illustrating an operation of the travel direction estimating device illustrated in FIG. 1.

With reference to FIG. 9, the description below deals in detail with an operation of selecting, out of the two travel direction vectors that are opposite in side to each other and that are determined in the step S513, a travel direction vector indicative of a direction in which a moving body is traveling.

The travel direction estimating device of the present embodiment, in the step S1, estimates a travel direction through the method described above with reference to FIG. 7.

Next, the travel direction estimating device of the present embodiment, through the method below, determines the side (fore-and-aft) of the travel direction estimated. The travel direction estimating device determines such a direction on the basis of characteristics of a human being as shown in Table 2.

TABLE 2

| Phase difference | Left hand, inside | Right hand, outside | Left hand, outside | Right hand, inside |
|---|---|---|---|---|
| Wn – Ag | Around +90 degrees | Around –90 degrees | Around –90 degrees | Around +90 degrees |
| Wn – Af | Around –90 degrees | Around –90 degrees | Around +90 degrees | Around +90 degrees |

Table 2 shows empirical data to the following effect: In the case where the travel direction estimating device of the present embodiment is in a hand of a person walking while swinging his or her arms, there is a certain relation between a phase difference of the angular velocity component Wn and a phase difference of each of the acceleration components Ag and Af, the relation depending on (i) whether the hand holding the travel direction estimating device is the left hand or the right hand and (ii) the side of the side-to-side direction, in other words, whether the side-to-side direction is a direction toward (inward) or away from (outward) the body of the walker.

The travel direction estimating device held in the left hand with the screen facing inward and the travel direction estimating device held in the right hand with the screen facing outward spatially correspond to two positions traveling in parallel to each other as shown in Table 2. The phase difference (Wn–Ag) is thus identical in characteristic to the phase difference (Wn–Af) (hereinafter referred to as "first state").

The travel direction estimating device held in the left hand with the side-to-side direction being outward and the travel direction estimating device held in the right hand with the side-to-side direction being inward spatially correspond to two positions traveling in parallel to each other. The phase difference (Wn−Ag) is thus identical in characteristic to the phase difference (Wn−Af) (hereinafter referred to as "second state").

Figure 10:
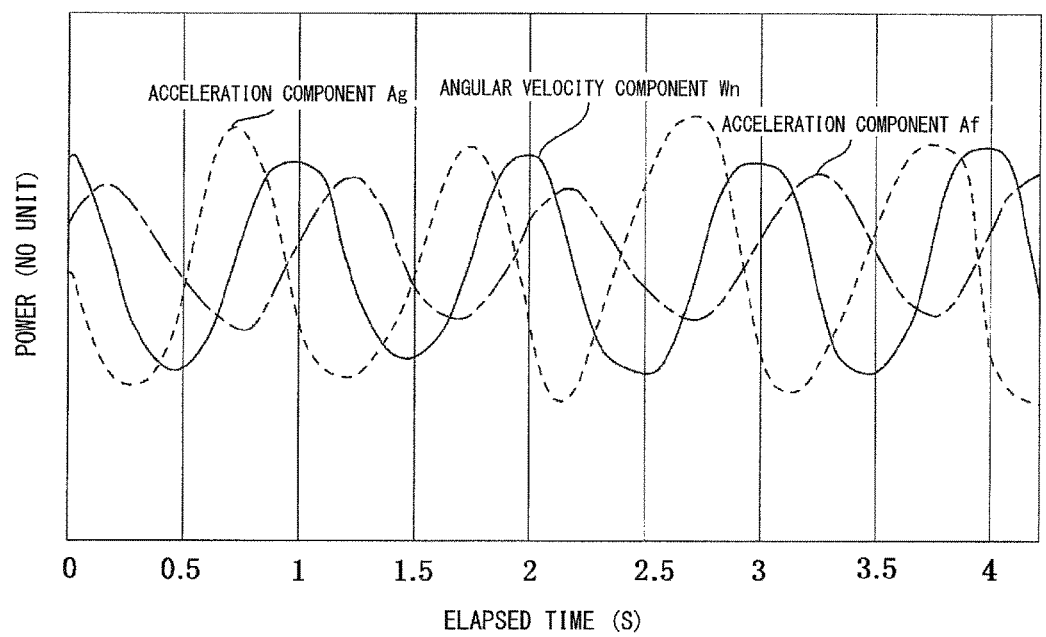
FIG. 10 is a graph illustrating a phase relation between acceleration components Ag and Af and an angular velocity component Wn on a time axis in the case where the travel direction estimating device is being held by a person walking while swinging his or her arms.

More specifically, in the case where, for instance, the travel direction estimating device of the present embodiment is being held in the left hand and the side-to-side direction of the travel direction estimating device is an inward direction, the phase difference (Wn−Ag) is around +90 degrees, whereas the phase difference (Wn−Af) is around −90 degrees for any walker as shown in Table 2. FIG. 10 is a graph illustrating a phase relation between the angular velocity component Wn and the acceleration components Ag and Af for the above case. The graph has a horizontal axis indicative of time (seconds) and a vertical axis indicative of power (no unit). FIG. 10, shows that the angular velocity component Wn has a phase that is approximately 90 degrees ahead of the phase of the acceleration component Ag and that is approximately 90 degrees behind the phase of the acceleration component Af.

As described above, the first state and the second state differ from each other in both the phase difference (Wn−Ag) and the phase difference (Wn−Af). Thus, calculating at least one of the two phase differences and comparing the size of the at least one with a corresponding value in Table 2 allows determination of what state the travel direction estimating device of the present embodiment is in.

In the case where the travel direction estimating device has estimated a travel direction, determining whether the travel direction estimating device is in the first state or the second state makes it possible to estimate even the travel direction of a moving body holding the travel direction estimating device such as a person holding it.

The description below deals in detail with a method of estimating the side of a travel direction with use of the above characteristics.

The travel direction estimating device of the present embodiment, in the step S2, calculates an angular velocity component Wn about the axis of the side-to-side direction of the travel direction estimating device. The travel direction estimating device calculates an angular velocity component Wn about the axis of the side-to-side direction with use of the side-to-side direction vector Wn projection calculating section 2418 on the basis of the size of an angular velocity sensed by the angular velocity sensor. As mentioned above, FIG. 5 illustrates an example power spectrum of an angular velocity component Wn calculated about the axis of the side-to-side direction.

The travel direction estimating device of the present embodiment then, in the step S3, calculates an acceleration component Ag in the gravitational direction. Specifically, the gravitational direction vector Ag projection calculating section 2414 calculates an acceleration component Ag in the gravitational direction on the basis of (i) the degree of acceleration sensed by the acceleration sensor and (ii) a gravitational direction vector estimated by the gravitational direction vector estimating section 2407. The gravitational direction vector estimating section 2407 estimates the gravitational direction on the basis of data obtained by the angular velocity sensor and the acceleration sensor. As mentioned above, FIG. 2 illustrates an example power spectrum of an acceleration component Ag calculated in the gravitational direction by the gravitational direction vector Ag projection calculating section 2414.

The travel direction estimating device of the present embodiment then, in the step S4, calculates a phase difference (Wn−Ag) between (i) the angular velocity component Wn about the axis of the side-to-side direction and (ii) an angular velocity component Ag about the gravitational axis. Specifically, the phase difference (Wn−Ag) calculating section 2435 calculates the phase difference (Wn−Ag) on the basis of (i) the angular velocity component Wn calculated by the side-to-side direction vector Wn projection calculating section 2418 about the axis of the side-to-side direction and (ii) the acceleration component Ag calculated by the gravitational direction vector Ag projection calculating section 2414 about the gravitational axis.

The travel direction estimating device of the present embodiment then, in the step S5, calculates a phase difference (Wn−Af) between (i) the angular velocity component Wn about the axis of the side-to-side direction and (ii) an acceleration component Af about the axis of the travel direction. Specifically, the phase difference (Wn−Af) calculating section 2436 calculates the phase difference (Wn−Af) on the basis of (i) the angular velocity component Wn calculated by the side-to-side direction vector Wn projection calculating section 2418 about the axis of the side-to-side direction and (ii) an acceleration component Af generated by the acceleration component (Af) generating section 14 about the axis of the travel direction.

The travel direction estimating device of the present embodiment then, in the step S6, causes the fore-and-aft direction determining section 17 to compare the size of at least one of (i) the phase difference (Wn−Ag) calculated by the phase difference (Wn−Ag) calculating section 2435 and (ii) the phase difference (Wn−Af) calculated by the phase difference (Wn−Af) calculating section 2436 with a corresponding value in Table 2. The travel direction estimating device thus determines whether the travel direction estimating device is in the first state or the second state and consequently determines a fore-and-aft direction.

The fore-and-aft direction determining section 17 can estimate a fore-and-aft direction more reliably in the case where it refers to both the phase difference (Wn−Ag) and the phase difference (Wn−Af) than in the case where it refers to only one of the phase difference (Wn−Ag) and the phase difference (Wn−Af).

The travel direction determining section 18 then estimates a travel direction and its side in correspondence with (i) the travel direction selected by the travel direction selecting section 16 and (ii) the fore-and-aft direction estimated by the fore-and-aft direction determining section 17.

As described above, the travel direction estimating device of an embodiment of the present invention is capable of highly accurately estimating not only the travel direction of a moving body (such as a person) holding the travel direction estimating device but also the side of the travel direction.

(Second Embodiment)

The description below deals with a second embodiment of the present invention. The second embodiment of the present invention assumes that the travel direction has not changed over a predetermined period (for example, 128 samples=1.28 seconds, for 100 Hz) and thus intends to reduce the calculation cost of discrete Fourier transform. The description below of the present embodiment does not deal with any constituent member similar to a corresponding constituent member described above for the first embodiment.

Figure 11:
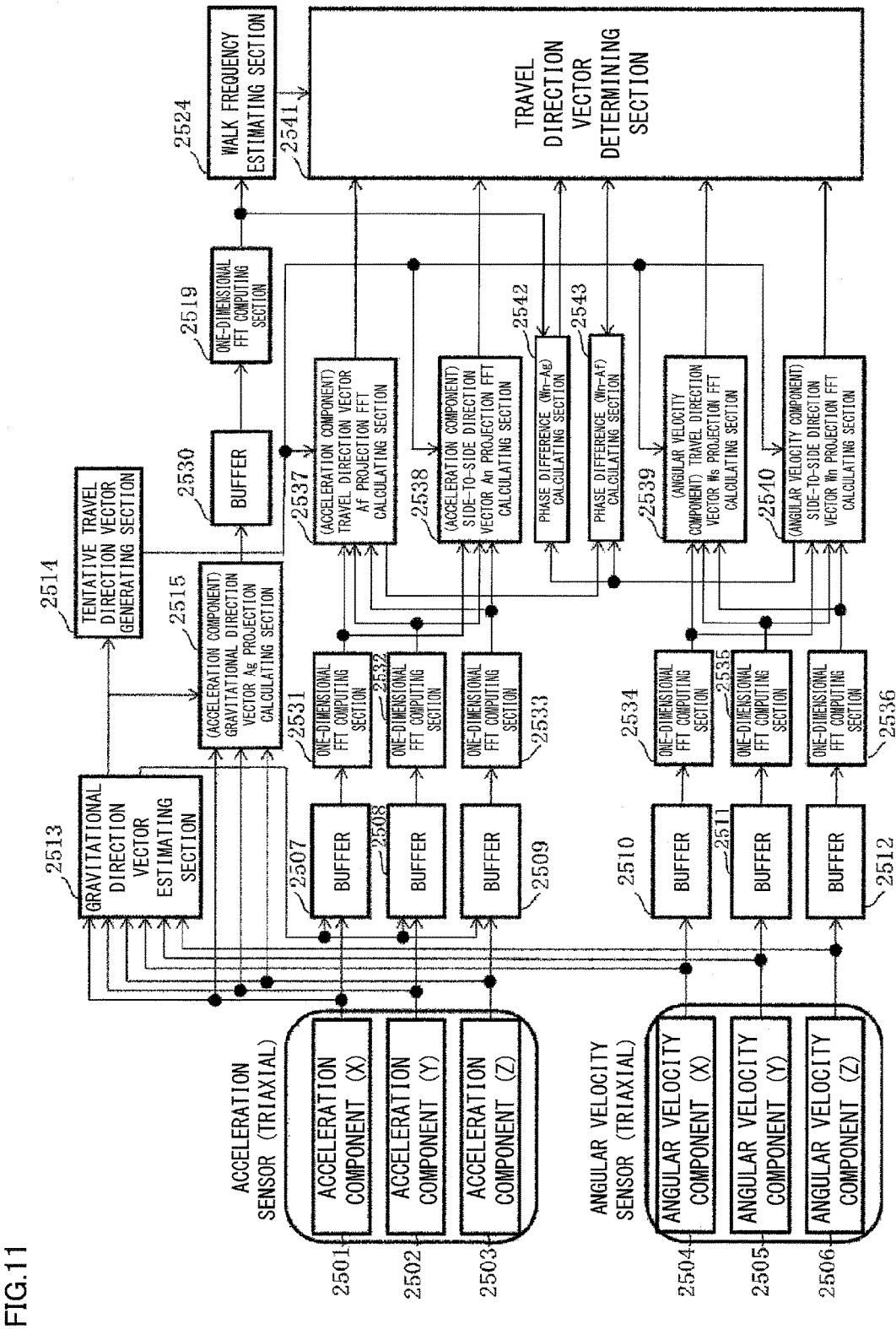
FIG. 11 is a functional block diagram illustrating a basic configuration of a device of a second embodiment of the present invention for estimating a travel direction of a moving body.

FIG. 11 is a functional block diagram illustrating a basic configuration of a device of the second embodiment of the present invention for estimating a travel direction of a moving body. The travel direction estimating device includes an acceleration sensor (triaxial) 2501, 2502, 2503 and an angular velocity sensor (triaxial) 2504, 2505, 2506, which include six sensing sections on a rectangular coordinate system as measuring sections for a moving body. The acceleration sensor and the angular velocity sensor produce their respective outputs, which are not necessarily raw data of the individual sensors and which may be appropriately calibrated data.

The travel direction estimating device includes a gravitational direction vector estimating section 2513, which (i) receives an acceleration vector (triaxial) measured by the acceleration sensor and an angular velocity vector (triaxial) measured by the angular velocity sensor, (ii) estimates a gravitational direction vector, and (iii) outputs the gravitational direction vector estimated. The gravitational direction vector referred to herein serves as a unit vector. Since the degree of gravitational acceleration is already known in principle, the gravitational direction vector estimating section 2513 can calculate a gravitational acceleration vector simultaneously. The gravitational direction vector estimating section 2513 can store a motion acceleration vector of a moving body in buffers for the respective axes by storing the resulting vector component which was removed the gravitational acceleration vector from the output of the acceleration sensor, in buffers.

Specifically, the travel direction estimating device performs a process below of storing acceleration components in buffers. A buffer 2507 (i) receives an output of an acceleration component (X axis) and a gravitational acceleration vector (X axis component) and (ii) stores an acceleration component remaining after removing the gravitational acceleration vector (X axis component) from the acceleration component (X axis). A buffer 2508 (i) receives an output of an acceleration component (Y axis) and a gravitational acceleration vector (Y axis component) and (ii) stores an acceleration component remaining after removing the gravitational acceleration vector (Y axis component) from the acceleration component (Y axis). A buffer 2509 (i) receives an output of an acceleration component (Z axis) and a gravitational acceleration vector (Z axis component) and (ii) stores an acceleration component remaining after removing the gravitational acceleration vector (Z axis component) from the acceleration component (Z axis).

The travel direction estimating device stores, in respective buffers, outputs themselves of triaxial elements of the angular velocity sensor as an angular velocity vector. A buffer 2510 stores an angular velocity component (X axis), a buffer 2511 stores an angular velocity component (Y axis), and a buffer 2512 stores an angular velocity component (Z axis).

The travel direction estimating device includes a one-dimensional FFT computing section 2531, which (i) receives a data row from the buffer 2507 storing the motion acceleration component (X axis), (ii) performs a one-dimensional FFT computing process on the data row to determine FFT data as transformed in a frequency domain, and (iii) outputs the FFT data.

The travel direction estimating device includes a one-dimensional FFT computing section 2532, which (i) receives a data row from the buffer 2508 storing the motion acceleration component (Y axis), (ii) performs a one-dimensional FFT computing process on the data row to determine FFT data as transformed in a frequency domain, and (iii) outputs the FFT data.

The travel direction estimating device includes a one-dimensional FFT computing section 2533, which (i) receives a data row from the buffer 2509 storing the motion acceleration component (Z axis), (ii) performs a one-dimensional FFT computing process on the data row to determine FFT data as transformed in a frequency domain, and (iii) outputs the FFT data.

The travel direction estimating device includes a one-dimensional FFT computing section 2534, which (i) receives a data row from the buffer 2510 storing the angular velocity component (X axis), (ii) performs a one-dimensional FFT computing process on the data row to determine FFT data as transformed in a frequency domain, and (iii) outputs the FFT data.

The travel direction estimating device includes a one-dimensional FFT computing section 2535, which (i) receives a data row from the buffer 2511 storing the angular velocity component (Y axis), (ii) performs a one-dimensional FFT computing process on the data row to determine FFT data as transformed in a frequency domain, and (iii) outputs the FFT data.

The travel direction estimating device includes a one-dimensional FFT computing section 2536, which (i) receives a data row from the buffer 2512 storing the angular velocity component (Z axis), (ii) performs a one-dimensional FFT computing process on the data row to determine FFT data as transformed in a frequency domain, and (iii) outputs the FFT data.

The travel direction estimating device includes an (acceleration component) gravitational direction vector projection calculating section 2515, which (i) receives a gravitational direction vector outputted by the gravitational direction vector estimating section 2513 and an acceleration component of the acceleration sensor 2501, 2502, 2503 for outputting an acceleration component (triaxial), (ii) determines a component projected for the gravitational direction vector of the motion acceleration vector, and (iii) outputs the component projected. This output is stored in a buffer 2530.

The component projected for the gravitational direction vector of the motion acceleration vector, which component is stored in the buffer 2530, is then transformed by the one-dimensional FFT computing section 2519 into FFT data in a frequency domain and outputted by the one-dimensional FFT computing section 2519.

The travel direction estimating device includes a walk frequency estimating section 2524, which estimates a fundamental frequency of a walk motion on the basis of the FFT data outputted by the one-dimensional FFT computing section 2519. The walk frequency estimating section 2524 may perform this estimation through the method described above for the first embodiment.

The travel direction estimating device includes a tentative travel direction vector generating section 2514, which (i) receives an output (gravitational direction vector) of the gravitational direction vector estimating section 2513, (ii) generates a comprehensive group of candidate travel direction vectors orthogonal to the gravitational direction vector, and (iii) outputs the group of candidates. The tentative travel direction vector generating section 2514 generates a comprehensive group of candidate travel direction vectors through a method similar to that described above for the first embodiment.

The travel direction estimating device includes an (acceleration component) travel direction vector projection FFT calculating section 2537, which (i) receives tentative travel direction vectors generated and outputted by the tentative travel direction vector generating section 2514 and FFT data on the individual components of the motion acceleration vector that are outputted by the respective one-dimensional FFT computing sections 2531, 2532, and 2533, (ii) calculates FFT data on a component resulting from projecting the motion acceleration vector for each tentative travel direction vector, and (iii) outputs the FFT data calculated. This calculation is justifiable only on the assumption that the travel direction vector does not change during a FFT sampling time. The above calculation is an approximate calculation in actuality. The above arrangement can greatly reduce the number of one-dimensional FFT computing operations.

The travel direction estimating device includes an (acceleration component) side-to-side direction vector projection FFT calculating section 2538, which (i) receives side-to-side direction vectors generated and outputted by the tentative travel direction vector generating section 2514 and FFT data on the individual components of the motion acceleration vector that are outputted by the respective one-dimensional FFT computing sections 2531, 2532, and 2533, (ii) calculates FFT data on a component resulting from projecting the motion acceleration vector for each side-to-side direction vector (pitch axis), and (iii) outputs the FFT data calculated.

The travel direction estimating device includes an (angular velocity component) travel direction vector projection FFT calculating section 2539, which (i) receives tentative travel direction vectors generated and outputted by the tentative travel direction vector generating section 2514 and FFT data on the individual components of the angular velocity vector that are outputted by the respective one-dimensional FFT computing sections 2534, 2535, and 2536, (ii) calculates FFT data on a component resulting from projecting the angular velocity vector for each travel direction vector, and (iii) outputs the FFT data calculated.

The travel direction estimating device includes an (angular velocity component) side-to-side direction vector projection FFT calculating section 2540, which (i) receives side-to-side direction vectors generated and outputted by the tentative travel direction vector generating section 2514 and FFT data on the individual components of the angular velocity vector that are outputted by the respective one-dimensional FFT computing sections 2534, 2535, and 2536, (ii) calculates FFT data on a component resulting from projecting the angular velocity vector for each side-to-side direction vector (pitch axis), and (iii) outputs the FFT data calculated.

The travel direction estimating device includes a phase difference (Wn–Ag) calculating section 2542, which calculates a phase difference between an angular velocity component Wn in the side-to-side direction and an acceleration component Ag in the gravitational direction on the basis of (i) an output of the (angular velocity component) side-to-side direction vector Wn projection FFT calculating section 2540 and (ii) an output generated by the one-dimensional FFT computing section 2519 through Fourier transform of the result of calculation by the (acceleration component) gravitational direction vector Ag projection calculating section 2515.

The travel direction estimating device includes a phase difference (Wn–Af) calculating section 2543, which calculates a phase difference between the angular velocity component Wn in the side-to-side direction and an acceleration component Af in the travel direction on the basis of (i) an output of the (angular velocity component) side-to-side direction vector Wn projection FFT calculating section 2540 and (ii) an output of the (acceleration component) travel direction vector Af projection FFT calculating section 2537.

The travel direction estimating device includes a travel direction vector determining section 2541, which is an element for (i) receiving an output (walk frequency) of the walk frequency estimating section 2524 and four respective pieces of FFT data of the (acceleration component) travel direction vector projection FFT calculating section 2537, the (acceleration component) side-to-side direction vector projection FFT calculating section 2538, the (angular velocity component) travel direction vector projection FFT calculating section 2539, and the (angular velocity component) side-to-side direction vector projection FFT calculating section 2540, (ii) determining a travel direction vector, and (iii) outputting the travel direction vector determined. The travel direction vector determining section 2541, which determines a travel direction vector on the basis of a walk frequency and FFT data (four pieces), uses a determining method similar to that described above for the first embodiment.

Figure 12:
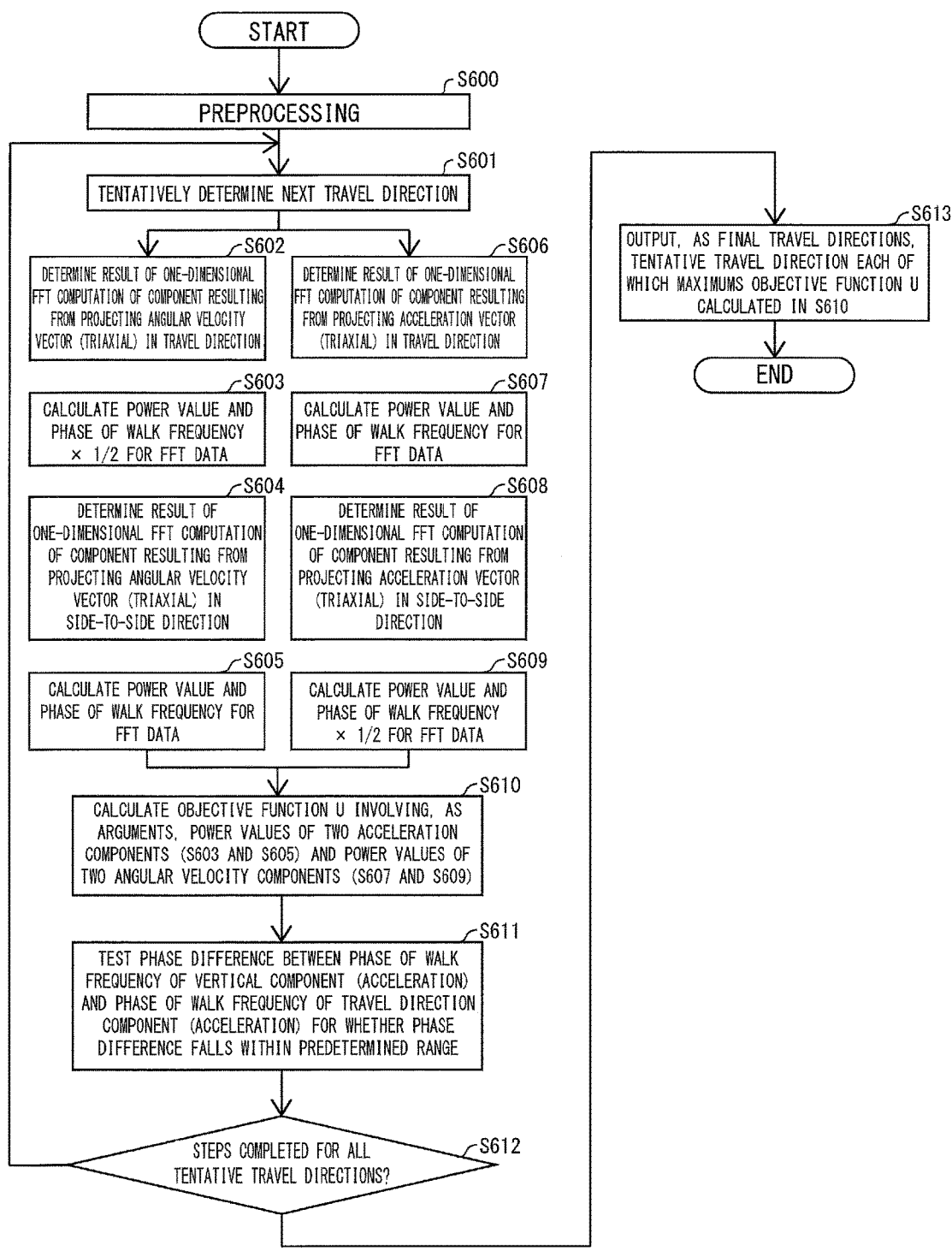
FIG. 12 is a flowchart illustrating a process that the device of the second embodiment of the present invention for estimating a travel direction of a moving body performs to estimate a travel direction.

FIG. 12 is a flowchart illustrating a process that the device of the second embodiment of the present invention for estimating a travel direction of a moving body performs to estimate a travel direction. The travel direction estimating device first performs a process of calculating necessary basic data as a preprocessing preceding the process of estimating a travel direction (step S600). This preprocessing is similar to that described above for the first embodiment with reference to FIG. 4, and will not be described below in detail.

The tentative travel direction vector generating section 2514 is provided with (i) a resolving power (for example, 0.5-degree units) for estimation and (ii) a gravitational direction vector. The tentative travel direction vector generating section 2514 generates, in the 0.5-degree units, a group of candidates for a travel direction vector orthogonal to the gravitational direction vector. The tentative travel direction vector generating section 2514 comprehensively and sequentially outputs one of those candidates (tentative travel direction vectors) (step S601).

The (angular velocity component) travel direction vector projection FFT calculating section 2539 determines, through a linear combination of one-dimensional FFT computation of the individual components of an angular velocity vector, FFT data as transformed into a frequency domain from a component resulting from projecting the angular velocity vector for each tentative travel direction vector (step S602). The (angular velocity component) travel direction vector projection FFT calculating section 2539 (i) receives tentative travel direction vectors generated and outputted by the tentative travel direction vector generating section 2514 and FFT data on the individual components of the angular velocity vector that are outputted by the respective one-dimensional FFT computing sections 2534, 2535, and 2536 and (ii) calculates FFT data as transformed. In the case where, for instance, the travel direction estimating device is provided with a tentative travel direction vector ($d_x$, $d_y$, $d_z$), the (angular velocity component) travel direction vector projection FFT calculating section 2539 performs Fourier transform of an angular velocity component resulting from projecting an angular velocity vector for each tentative travel direction vector through a linear combination of Fourier transform of the individual components (on the X, Y, and Z axes) of the angular velocity vector. More specifically, the (angular velocity component) travel direction vector projection FFT calculating section 2539 performs Fourier transform of the angular velocity component represented by the following equation:

$$\tilde{w}_d(t) = w_x(t)d_x + w_y(t)d_y + w_z(t)d_z \quad \text{[Math. 4]}$$

through a linear combination of Fourier transform of the X, Y, and Z axis components of the angular velocity vector.

$$\tilde{W}_d(\omega) = W_x(\omega)d_x + W_y(\omega)d_y + W_z(\omega)d_z \quad \text{[Math. 5]}$$

The above computing process can, on the assumption that the travel direction vector does not change during only a length of a sampling time necessary for the FFT computation, provide FFT data on a projected component through a linear combination of one-dimensional FFT data on the individual components. In actuality, however, the travel direction vector never remains the same over a length of a sampling time. The above computing process thus involves mere approximate calculation. The computing process can, however, greatly reduce the number of FFT computing operations.

The travel direction vector determining section 2541 determines a power value and phase of a frequency component of a half of a walk frequency for the FFT data determined in the step S602 (step S603).

The (angular velocity component) side-to-side direction vector projection FFT calculating section 2540 determines, through a linear combination of one-dimensional FFT computation of the individual components of an angular velocity vector, FFT data as transformed into a frequency domain from a component resulting from projecting the angular velocity vector for each side-to-side direction vector (pitch axis) (step S604). The (angular velocity component) side-to-side direction vector projection FFT calculating section 2540 calculates such FFT data through a method similar to that for the travel direction vector projection FFT computation on an angular velocity component.

The travel direction vector determining section 2541 determines a power value and phase of a frequency component of a walk frequency for the FFT data determined in the step S604 (step S605).

The (acceleration component) travel direction vector projection FFT calculating section 2537 determines, through a linear combination of one-dimensional FFT computation of the individual components of an acceleration vector, FFT data as transformed into a frequency domain from a component resulting from projecting the acceleration vector for each tentative travel direction vector (step S606). In the case where, for instance, the travel direction estimating device is provided with a tentative travel direction vector $(d_x, d_y, d_z)$, the (acceleration component) travel direction vector projection FFT calculating section 2537 performs Fourier transform of an acceleration component resulting from projecting an acceleration vector for each tentative travel direction vector through a linear combination of Fourier transform of the individual components (on the X, Y, and Z axes) of the acceleration vector. More specifically, the (acceleration component) travel direction vector projection FFT calculating section 2537 performs Fourier transform of the acceleration component represented by the following equation:

$$\tilde{a}_d(t) = a_x(t)d_x + a_y(t)d_y + a_z(t)d_z \quad \text{[Math. 6]}$$

through a linear combination of Fourier transform of the X, Y, and Z axis components of the acceleration vector.

$$\tilde{A}_d(\omega) = A_x(\omega)d_x + A_y(\omega)d_y + A_z(\omega)d_z \quad \text{[Math. 7]}$$

The travel direction vector determining section 2541 determines a power value and phase of a frequency component of a walk frequency for the FFT data determined in the step S606 (step S607).

The (acceleration component) side-to-side direction vector projection FFT calculating section 2538 determines, through a linear combination of one-dimensional FFT computation of the individual components of an acceleration vector, FFT data as transformed into a frequency domain from a component resulting from projecting the acceleration vector for each side-to-side direction vector (pitch axis) (step S608). The (acceleration component) side-to-side direction vector projection FFT calculating section 2538 calculates such FFT data through a method similar to that for the travel direction vector projection FFT computation on an acceleration component.

The travel direction vector determining section 2541 determines a power value and phase of a frequency component of a half of a walk frequency for the FFT data determined in the step S608 (step S609).

The travel direction vector determining section 2541, through a method identical to that described above for the first embodiment, calculates the value of an objective function on the basis of the power values determined in the respective steps S603, S605, S607, and S609 (step S610).

The travel direction vector determining section 2541 (i) finds a phase difference between the phase determined in the step S607 and the phase determined in the step S600 of the component resulting from projecting the acceleration vector for the gravitational direction vector and (ii) tests the phase difference for whether it falls within a predetermined range (step S611).

The travel direction vector determining section 2425 allows the process to proceed to (i) the step S613 in the case where the travel direction estimating device has finished performing the above process for all the tentative travel direction vectors or to (ii) the step S601 otherwise (step S612).

The travel direction vector determining section 2541 (i) selects, from among candidate travel direction vectors that have passed the test in the step S611, travel direction vectors each of which maximizes the objective function U and (ii) outputs, as final travel direction vectors, two vectors opposite in direction to each other (step S613).

As described above, assuming that the travel direction has not changed over a predetermined period, the result of discrete Fourier transform (DFT) during such a period can be expressed by a linear combination of discrete Fourier transform of the individual components on a sensor coordinate system. The present embodiment thus eliminates the need to generate sample data for all the 720 tentative travel direction vectors (in 0.5-degree steps) and perform a discrete Fourier transform computation process 1440 times as in the first embodiment. The present embodiment can thus reduce the calculation cost.

More specifically, the present embodiment eliminates the need to perform discrete Fourier transform each time: The present embodiment performs discrete Fourier transform for the three axes (namely, the X, Y, and Z axes) of an acceleration vector and an angular velocity vector on a sensor coordinate system and calculates an inner product of (i) a gravitational direction vector generated immediately before the discrete Fourier transform and (ii) an acceleration vector and an inner product of (i) the gravitational direction vector and an angular velocity vector. Since the gravitational direction vector serves as a unit vector, the present embodiment can determine respective gravitational direction components of the acceleration vector and the angular velocity vector. This is because assuming that the gravitational direction vector does not change, the result of Fourier transform of a linear combination of an acceleration vector and a gravitational direction vector matches a linear combination of the result of Fourier transform of the individual components of the acceleration vector and the gravitational direction vector. Similarly, the result of Fourier transform of a linear combination of an angular velocity vector and a gravitational direction vector matches a linear combination of the result of Fourier transform of the individual components of the angular velocity vector and the gravitational direction vector.

Thus, even in the case where the tentative travel direction vector generating section 2514 has generated a plurality of candidate travel direction vectors, the present embodiment is merely required to perform a discrete Fourier transform computation process only six times, that is, for the individual components (on the X, Y, and Z axes) of an acceleration vector and the individual components (on the X, Y, and Z axes) of an angular velocity vector. The present embodiment can thus greatly reduce the number of FFT computing operations.

Through a method similar to that used by the travel direction vector determining section 2425 of the first embodiment, the travel direction vector determining section 2541 can select, out of the two travel direction vectors that are opposite in direction to each other and that are outputted in the step S613, a vector indicative of the direction in which a moving body is traveling.

The embodiments of the present invention provide a travel direction estimating device and a travel direction estimating method each of which produces the effects of the present invention even in the case where, for instance, the travel direction estimating device is in a pocket positioned on the lower body of a person walking or in a hand bag held by a person walking, let alone in the case where the travel direction estimating device is being held in a hand of a person walking while swinging his or her arms. This is because the characteristics shown in Table 2 above are obtained for either case.

REFERENCE SIGNS LIST

10 discrete Fourier transform section (angular velocity triaxial component)
11 discrete Fourier transform section (acceleration triaxial component)
16 travel direction selecting section
17 fore-and-aft direction determining section
18 travel direction determining section
2401, 2402, 2403 acceleration component
2404, 2405, 2406 angular velocity component
2407 gravitational direction vector estimating section
2413 tentative travel direction vector generating section
2414 (acceleration component) gravitational direction vector projection calculating section
2415 (acceleration component) travel direction vector projection calculating section
2416 (acceleration component) side-to-side direction vector projection calculating section
2417 (angular velocity component) travel direction vector projection calculating section
2418 (angular velocity component) side-to-side direction vector projection calculating section
2430-2434 buffer
2419-2423 one-dimensional FFT computing section
2424 walk frequency estimating section
2425 travel direction vector determining section
2435, 2542 phase difference (Wn–Ag) calculating section
2436, 2543 phase difference (Wn–Af) calculating section

The invention claimed is:

1. A travel direction estimating device for estimating a travel direction of a moving body on which the travel direction estimating device is being carried with a variable positional relationship, the travel direction estimating device comprising:

an acceleration sensor, wherein the acceleration sensor is configured to measure an acceleration vector component of the moving body and generate acceleration vector component data;
an angular velocity sensor configured to measure an angular velocity vector component of the moving body and generate angular velocity vector component data;
a processor configured to:
estimate a gravitational direction vector of the moving body based on the acceleration vector component data and the angular velocity vector component data;
generate a tentative travel direction vector and a side-to-side direction vector based on the estimated gravitational direction vector;
calculate gravitational component data resulting from projecting, for the gravitational direction vector, the acceleration vector component data remaining after removing the gravitational direction vector from an acceleration component data;
output a frequency domain component of the calculated gravitational component data and determine a walk frequency and a phase of a frequency component of the walk frequency;
based on the tentative travel direction vector, the gravitational direction vector, and the acceleration vector component data, calculate acceleration component data resulting from projecting, for the tentative travel direction vector, the acceleration vector component data remaining after removing a gravitational acceleration vector from the acceleration vector component data;
output a frequency domain component of the acceleration calculated component data;
based on the gravitational direction vector, the side-to-side direction vector, and the acceleration vector component data, calculate side-to-side component data resulting from projecting, for the side-to-side direction vector, the acceleration vector component data remaining after removing the gravitational acceleration vector from the acceleration vector component data;
output a frequency domain component of the side-to-side calculated component data;
based on the tentative travel direction vector and the angular velocity vector component data, calculate an angular-tentative component resulting from projecting the angular velocity vector component data onto the tentative travel direction vector;
output a frequency domain component of the calculated angular component;
based on the side-to-side direction vector and the angular velocity vector component data, calculate an angular-side-to-side component resulting from projecting the angular velocity vector component data onto the side-to-side direction vector;
output a frequency domain component of the angular-side-to-side calculated component; and
based on the walk frequency, the frequency domain component resulting from projecting an acceleration component travel direction vector, the frequency domain component resulting from projecting an acceleration component side-to-side direction vector, the frequency domain component resulting from projecting an angular velocity travel direction vector, and the frequency domain component resulting from projecting an angular velocity side-to-side direction vector, calculate a power value from the frequency component of the walk frequency or a frequency component of a half of the walk frequency and calculate an objective function;

from the frequency domain component resulting from projecting the acceleration component travel direction vector, calculating the phase of the frequency component of the walk frequency and calculating a phase difference between the phase of the frequency component of the walk frequency and a phase of the walk frequency;

when the phase difference falls within a predetermined range, selecting as a candidate at least one tentative travel direction vector having a value of the objective function; and outputting, as a travel direction vector out of the at least one tentative travel direction vector as the candidate, a tentative travel direction vector that maximizes the value of the objective function.

2. The travel direction estimating device according to claim 1, wherein the processor is further configured to:

calculate component data resulting from projecting, for the gravitational direction vector, the acceleration vector component data remaining after removing the gravitational direction vector from the acceleration component data;

perform one-dimensional discrete Fourier transform computation on component data resulting from projecting the acceleration component data for the gravitational direction vector and outputting the frequency domain component; and determine a fundamental frequency of a walk motion and a phase of a frequency component of the fundamental frequency on a basis of the output of the one-frequency domain component.

3. The travel direction estimating device according to claim 1, wherein the processor is further configured to:

calculate the component resulting from projecting, for the tentative travel direction vector, the acceleration vector component data remaining after removing the gravitational acceleration vector from the acceleration vector component data; and perform one-dimensional discrete Fourier transform computation on an acceleration component and output the frequency domain component;

on the basis of the gravitational direction vector, the side-to-side direction vector, and the acceleration vector component data, calculate the component data resulting from projecting, for the side-to-side direction vector, the acceleration vector component data remaining after removing the gravitational acceleration vector from the acceleration vector component data; and perform one-dimensional discrete Fourier transform computation on an outputted acceleration component and output the frequency domain component;

on the basis of the tentative travel direction vector and the angular velocity vector component data, calculate the component resulting from projecting the angular velocity vector component data onto the tentative travel direction vector; and perform one-dimensional discrete Fourier transform computation on an angular velocity component and output the frequency domain component; and on the basis of the side-to-side direction vector and the angular velocity vector component data, calculate the component resulting from projecting the angular velocity vector component data onto the side-to-side direction vector; and perform one-dimensional discrete Fourier transform computation on an angular velocity component and output the frequency domain component.

4. The travel direction estimating device according to claim 1, wherein the processor is further configured to:

calculate a linear combination of (i) pieces of frequency domain component data that are outputted through one-dimensional discrete Fourier transform computation on respective acceleration components remaining after removing the gravitational acceleration vector from pieces of the acceleration vector component data and (ii) the tentative travel direction vector and for performing one-dimensional discrete Fourier transform on the linear combination;

calculate a linear combination of (i) pieces of frequency domain component data that are outputted through one-dimensional discrete Fourier transform computation on respective acceleration components remaining after removing the gravitational acceleration vector from pieces of the acceleration vector component data and (ii) the side-to-side direction vector and for performing one-dimensional discrete Fourier transform on the linear combination;

calculate a linear combination of (i) pieces of frequency domain component data that are outputted through one-dimensional discrete Fourier transform computation on respective pieces of the angular velocity vector component data and (ii) the tentative travel direction vector and for performing one-dimensional discrete Fourier transform on the linear combination; and calculate a linear combination of (i) pieces of frequency domain component data that are outputted through one-dimensional discrete Fourier transform computation on respective pieces of the angular velocity vector component data and (ii) the side-to-side direction vector and for performing one-dimensional discrete Fourier transform on the linear combination.

5. The travel direction estimating device according to claim 1, further comprising:

calculate a phase difference between the component resulting from projecting the angular velocity vector component data onto the side-to-side direction vector and at least one of (i) the component data resulting from projecting the acceleration vector component data for the gravitational direction vector and (ii) the component data resulting from projecting the acceleration vector component data for the tentative travel direction vector; and in correspondence with at least one calculated phase difference, selecting, out of two outputted travel direction vectors that are opposite in direction to each other, a vector indicative of the travel direction of the moving body.

6. The travel direction estimating device according to claim 1, further comprising:

calculate a first phase difference between (i) the component resulting from projecting the angular velocity vector component data onto the side-to-side direction vector and (ii) the component data resulting from projecting the acceleration vector component data for the gravitational direction vector;

calculate a second phase difference between (i) the component resulting from projecting the angular velocity vector component data onto the side-to-side direction vector and (ii) the component data resulting from projecting the acceleration vector component data for the tentative travel direction vector; and in correspondence with the first phase difference and the second phase difference, selecting, out of two outputted travel direction vectors that are opposite in direction to each other, a vector indicative of the travel direction of the moving body.

7. The travel direction estimating device according to claim 6, wherein the processor is further configured to:
(i) obtain in advance as reference data a first phase difference and a second phase difference corresponding to respective directions of the two travel direction vectors and (ii) compare, with the reference data, the calculated first phase difference and the calculated second phase difference.

8. A travel direction estimating method for estimating a travel direction of a moving body on which a travel direction estimating device is being carried with a variable positional relationship, the travel direction estimating device including an acceleration sensor, an angular velocity sensor, and a processor, the travel direction estimating method comprising:
a first step of measuring with the acceleration sensor and the angular velocity sensor an acceleration vector component and an angular velocity vector component of the moving body to generate acceleration vector component data and angular velocity vector component data;
a second step of estimating with the processor a gravitational direction vector of the moving body on a basis of the acceleration vector component data and the angular velocity vector component data both generated in the first step;
a third step of generating with the processor a tentative travel direction vector and a side-to-side direction vector on a basis of the gravitational direction vector estimated in the second step;
a fourth step of (i) calculating with the processor component data resulting from projecting, for the gravitational direction vector, the acceleration vector component data remaining after removing the gravitational direction vector estimated in the second step from the acceleration vector component data generated in the first step and (ii) outputting a frequency domain component of the calculated component data to determine a walk frequency and a phase of a frequency component of the walk frequency;
a fifth step of, (i) on a basis of the tentative travel direction vector generated in the third step, the gravitational direction vector estimated in the second step, and the acceleration vector component data generated in the first step, calculating with the processor component data resulting from projecting, for the tentative travel direction vector, the acceleration vector component data remaining after removing a gravitational acceleration vector from the acceleration vector component data and (ii) determining a frequency domain component of the calculated component data;
a sixth step of, (i) on a basis of the gravitational direction vector estimated in the second step, the side-to-side direction vector generated in the third step, and the acceleration vector component data generated in the first step, calculating with the processor component data resulting from projecting, for the side-to-side direction vector, the acceleration vector component data remaining after removing the gravitational acceleration vector from the acceleration vector component data and (ii) determining a frequency domain component of the calculated component data;

a seventh step of, (i) on a basis of the tentative travel direction vector generated in the third step and the angular velocity vector component data generated in the first step, calculating with the processor a component resulting from projecting the angular velocity vector component data onto the tentative travel direction vector and (ii) determining with the processor a frequency domain component of the calculated component;
an eighth step of, (i) on a basis of the side-to-side direction vector generated in the third step and the angular velocity vector component data generated in the first step, calculating with the processor a component resulting from projecting the angular velocity vector component data onto the side-to-side direction vector and (ii) determining with the processor a frequency domain component of the calculated component; and
a ninth step of, (i) on a basis of the walk frequency determined in the fourth step, the frequency domain component, determined in the fifth step, resulting from projecting the acceleration vector component data onto the tentative travel direction vector, the frequency domain component, determined in the sixth step, resulting from projecting the acceleration vector component data onto the side-to-side direction vector, the frequency domain component, determined in the seventh step, resulting from projecting the angular velocity vector component data onto the tentative travel direction vector, and the frequency domain component, determined in the eighth step, resulting from projecting the angular velocity vector component data onto the side-to-side direction vector, calculating with the processor a power value from the frequency component of the walk frequency or a frequency component of a half of the walk frequency to calculate an objective function, (ii) from the frequency domain component resulting from projecting the acceleration vector component data onto the travel direction vector, calculating with the processor the phase of the frequency component of the walk frequency to calculate a phase difference between the phase of the frequency component of the walk frequency and a calculated phase of the walk frequency, (iii) in a case where the phase difference falls within a predetermined range, selecting with the processor as a candidate at least one tentative travel direction vector having a value of the objective function, and (iv) determining with the processor, as a travel direction vector out of the at least one tentative travel direction vector as the candidate, a tentative travel direction vector that maximizes the value of the objective function.

9. The travel direction estimating method according to claim 8, wherein:
the fourth step includes:
a step of calculating with the processor component data resulting from projecting, for the gravitational direction vector, the acceleration vector component data remaining after removing the gravitational direction vector from the acceleration component data;
step of (i) performing with the processor one-dimensional discrete Fourier transform computation on component data resulting from projecting the acceleration component data for the gravitational direction vector and (ii) determining the frequency domain component; and
a step of determining with the processor a fundamental frequency of a walk motion and a phase of a frequency component of the fundamental frequency on a basis of the frequency domain component determined through the one-dimensional discrete Fourier transform computation.

10. The travel direction estimating method according to claim 8, wherein:
the fifth step includes a step of (i) calculating with the processor a component resulting from projecting, for the tentative travel direction vector, the acceleration vector component data remaining after removing the gravitational acceleration vector from the acceleration vector component data and (ii) performing with the processor one-dimensional discrete Fourier transform computation on the calculated component to determine the frequency domain component;
the sixth step includes a step of, (i) on the basis of the gravitational direction vector, the side-to-side direction vector, and the acceleration vector component data, calculating with the processor component data resulting from projecting, for the side-to-side direction vector, the acceleration vector component data remaining after removing the gravitational acceleration vector from the acceleration vector component data and (ii) performing with the processor one-dimensional discrete Fourier transform computation on the calculated component to determine the frequency domain component;
the seventh step includes a step of, (i) on the basis of the tentative travel direction vector and the angular velocity vector component data, calculating with the processor a component resulting from projecting the angular velocity vector component data onto the tentative travel direction vector and (ii) performing with the processor one-dimensional discrete Fourier transform computation on the calculated component to determine the frequency domain component; and
the eighth step includes a step of, (i) on the basis of the side-to-side direction vector and the angular velocity vector component data, calculating with the processor a component resulting from projecting the angular velocity vector component data onto the side-to-side direction vector and (ii) performing with the processor one-dimensional discrete Fourier transform computation on the calculated component to determine the frequency domain component.

11. The travel direction estimating method according to claim 8,
wherein:
the fifth step includes a step of calculating with the processor a linear combination of (i) pieces of frequency domain component data that are outputted through one-dimensional discrete Fourier transform computation on respective acceleration components remaining after removing the gravitational acceleration vector from pieces of the acceleration vector component data and (ii) the tentative travel direction vector and for performing one-dimensional discrete Fourier transform on the linear combination;
the sixth step includes a step of calculating with the processor a linear combination of (i) pieces of frequency domain component data that are outputted through one-dimensional discrete Fourier transform computation on respective acceleration components remaining after removing the gravitational acceleration vector from pieces of the acceleration vector component data and (ii) the side-to-side direction vector and for performing one-dimensional discrete Fourier transform on the linear combination;
the seventh step includes a step of calculating with the processor a linear combination of (i) pieces of frequency domain component data that are outputted through one-dimensional discrete Fourier transform computation on respective pieces of the angular velocity vector component data and (ii) the tentative travel direction vector and for performing one-dimensional discrete Fourier transform on the linear combination; and
the eighth step includes a step of calculating with the processor a linear combination of (i) pieces of frequency domain component data that are outputted through one-dimensional discrete Fourier transform computation on respective pieces of the angular velocity vector component data and (ii) the side-to-side direction vector and for performing one-dimensional discrete Fourier transform on the linear combination.

12. The travel direction estimating method according to claim 8, further comprising:
a tenth step of calculating with the processor a phase difference between the component resulting from projecting the angular velocity vector component data onto the side-to-side direction vector and at least one of (i) the component data resulting from projecting the acceleration vector component data for the gravitational direction vector and (ii) the component data resulting from projecting the acceleration vector component data for the tentative travel direction vector; and
an eleventh step of, in correspondence with at least one phase difference calculated in the tenth step, selecting with the processor, out of two travel direction vectors that are determined in the ninth step and that are opposite in direction to each other, a vector indicative of the travel direction of the moving body.

13. The travel direction estimating method according to claim 8, further comprising:
a first phase difference calculating step of calculating with the processor a first phase difference between (i) the component resulting from projecting the angular velocity vector component data onto the side-to-side direction vector and (ii) the component data resulting from projecting the acceleration vector component data for the gravitational direction vector;
a second phase difference calculating step of calculating with the processor a second phase difference between (i) the component resulting from projecting the angular velocity vector component data onto the side-to-side direction vector and (ii) the component data resulting from projecting the acceleration vector component data for the tentative travel direction vector; and
a travel direction selecting step of, in correspondence with the first phase difference and the second difference, selecting with the processor, out of two travel direction vectors that are determined in the ninth step and that are opposite in direction to each other, a vector indicative of the travel direction of the moving body.

14. The travel direction estimating method according to claim 13, further comprising:
a step of obtaining with the processor in advance as reference data a first phase difference and a second phase difference corresponding to respective directions of the two travel direction vectors; and
a step of comparing with the processor, with the reference data, the first phase difference calculated in the first phase difference calculating step and the second phase difference calculated in the second phase difference calculating step.

* * * * *